United States Patent
Moshavi et al.

(10) Patent No.: US 7,333,466 B2
(45) Date of Patent: Feb. 19, 2008

(54) REDUCED COMPLEXITY MMSE MULTIUSER DETECTION FOR A MULTIRATE CDMA LINK

(75) Inventors: Shimon Moshavi, Beit Shemesh (IL); Daniel Yellin, Raanana (IL); Kobby Pick, Modiin (IL)

(73) Assignee: Intel Corporation, Santa Clara, CA (US)

( * ) Notice: Subject to any disclaimer, the term of this patent is extended or adjusted under 35 U.S.C. 154(b) by 1150 days.

(21) Appl. No.: 10/291,189

(22) Filed: Nov. 8, 2002

(65) Prior Publication Data

US 2004/0090906 A1 May 13, 2004

(51) Int. Cl.
*H04B 7/216* (2006.01)

(52) U.S. Cl. .................. 370/342; 370/441; 375/260

(58) Field of Classification Search .............. None
See application file for complete search history.

(56) References Cited

U.S. PATENT DOCUMENTS

| | | | |
|---|---|---|---|
| 6,208,684 B1 | 3/2001 | Yellin et al. | |
| 6,426,973 B1 * | 7/2002 | Madhow et al. | 375/231 |
| 6,570,863 B1 * | 5/2003 | Kim et al. | 370/342 |
| 6,570,864 B1 * | 5/2003 | Kim et al. | 370/342 |
| 6,678,309 B1 * | 1/2004 | Kitahara | 375/144 |
| 6,680,902 B1 * | 1/2004 | Hudson | 370/210 |
| 6,813,258 B2 * | 11/2004 | Hans et al. | 370/335 |
| 7,161,976 B2 * | 1/2007 | Sano | 375/148 |
| 2004/0088610 A1 * | 5/2004 | Kobayakawa | 714/701 |

FOREIGN PATENT DOCUMENTS

| | | |
|---|---|---|
| CN | 1165458 | 11/1997 |
| CN | 1240940 | 1/2000 |

OTHER PUBLICATIONS

Chen, J., et al., "Analysis of Decorrelator-Based Receivers for Multirate DS/CDMA Communications", *IEEE Transactions on Vehicular Technology*, 48(6):1966-1983 (1999).
Saquib, M., et al., "Decorrelating Detectors for a Dual Rate Synchronous DS/CDMA System", *Wireless Personal Communications*, 9:197-214 (1998).
Saquib, et al., "A Decision Feedback Decorrelator for a Dual Rate Synchronous DS/CDMA System", Proc. *Globecom*, London, UK, vol. 3, pp. 1804-1808, Nov. 1996.
Saquib, et al., "Decorrelating Detectors for a Dual Rate Synchronous DS/CDMA System", Proc. *IEEE Veh. Technol. Conf.*, Atlanta, Georgia, pp. 377-381, May 1996.

(Continued)

*Primary Examiner*—Bob A. Phunkulh
(74) *Attorney, Agent, or Firm*—Fish & Richardson P.C.

(57) ABSTRACT

A system to decode a multirate CDMA signal. In one aspect the system includes a high rate detector to generate high rate outputs based upon decoding an input signal that includes high rate users and low rate users. The high rate outputs include actual high rate users and effective high rate users. A second stage applies a first linear transformation to the high rate outputs to generate second stage outputs. A third stage applies a second linear transformation to the second stage outputs to generate decoupled low rate user outputs and decoupled actual high rate user outputs.

109 Claims, 7 Drawing Sheets

OTHER PUBLICATIONS

Moshavi, "Multi-User Detection for DS-CDMA Communications", *IEEE Communications Magazine*, vol. 34, No. 10, pp. 124-136, Oct. 1996.

Saquib, et al., "A Two Stage Decorrelator for a Dual Rate Synchronous DS/CDMA System", *IEEE Proc. Intern. Conf. on Commun.*, vol. 1, pp. 34-338, 1997.

Xie, et al., "A Family of Suboptimum Detectors for Coherent Multiuser Communications", *IEEE Journal of Selected Communications*, vol. 8, No. 4, pp. 683-690, May 1990.

Wu, et al., "CDMA with Multiple Chip Rates for Multi-Media Communications", *Proceedings of the 1994 Conference on Information Science and Systems*, Princeton, New Jersey, pp. 992-997, Princeton, New Jersey, Mar. 1994.

Wyrwas, et al., "Multiple Access Options for Multi-Media Wireless Systems", *Wireless Communications Future Directions*, Kluwer Academic Publishers, Boston/Dordrecht/London, pp. 305-317, 1993.

Saquib, "Quality of Service for Multi-Rate DS/CDMA Systems with Multi-User Detection", Dissertation submitted to the Graduate School—New Brunswick, Rutgers, The State University of New Jersey, for the degree of Doctor of Philosophy, Graduate Program in Electrical and Computer Engineering, Jan. 1998.

Verdu, *Multi-User Detection*, Cambridge University Press, Cambridge, United Kingdom, Chapter 6, pp. 288-343, 1998.

Huang, et al., "Subspace-Based Blind Adaptive Multiuser Detection for Multirate DS/CDMA signals", *Proceedings of the 11th IEEE Signal Processing Workshop on Statistical Signal Processing*, pp. 106-109, Aug. 2001.

* cited by examiner

REDUCED COMPLEXITY MMSE MULTIUSER DETECTION FOR A MULTIRATE CDMA LINK

TECHNICAL FIELD

An aspect of this invention relates to multirate code-division multiple access (CDMA) detection systems.

BACKGROUND

Until recently, conventional CDMA detection has been accomplished by using single-user detectors in which each user is detected separately via a matched filter (or correlator) receiver. Detection of each user is done without regard for the existence of other co-channel users.

Recently, multiuser detection has been developed for wireless communication. In multiuser detection, information (e.g., code, timing, channel) of multiple users is jointly used to better detect each individual user. Conventional minimum mean square error (MMSE) multiuser detection may offer significant performance improvements over conventional CDMA detection, but at the cost of increased receiver complexity. In conventional symbol level MMSE multiuser detection, a linear transformation that minimizes the mean square error may be applied to the outputs of the conventional detector for each user of a single rate system in order to decouple the co-channel interfering users. The computation of the standard MMSE linear transformation may involve a matrix inversion, where the order of the matrix is proportional to the number of users. As the order of the matrix increases, the computation of the inverse matrix becomes more difficult.

In a multirate system, a high-rate data user operating at M times the data rate of a low-rate user, appears to a conventional MMSE detector as M low-rate users, causing a significant increase in the order of the matrix and resulting computation complexity. In other words, an MMSE linear transformation may be applied every low-rate symbol interval to the conventional detector outputs of all symbols from all users that occur in the low-rate user symbol interval.

DESCRIPTION OF DRAWINGS

Like reference symbols in the various drawings indicate like elements.

DETAILED DESCRIPTION

Figure 1:
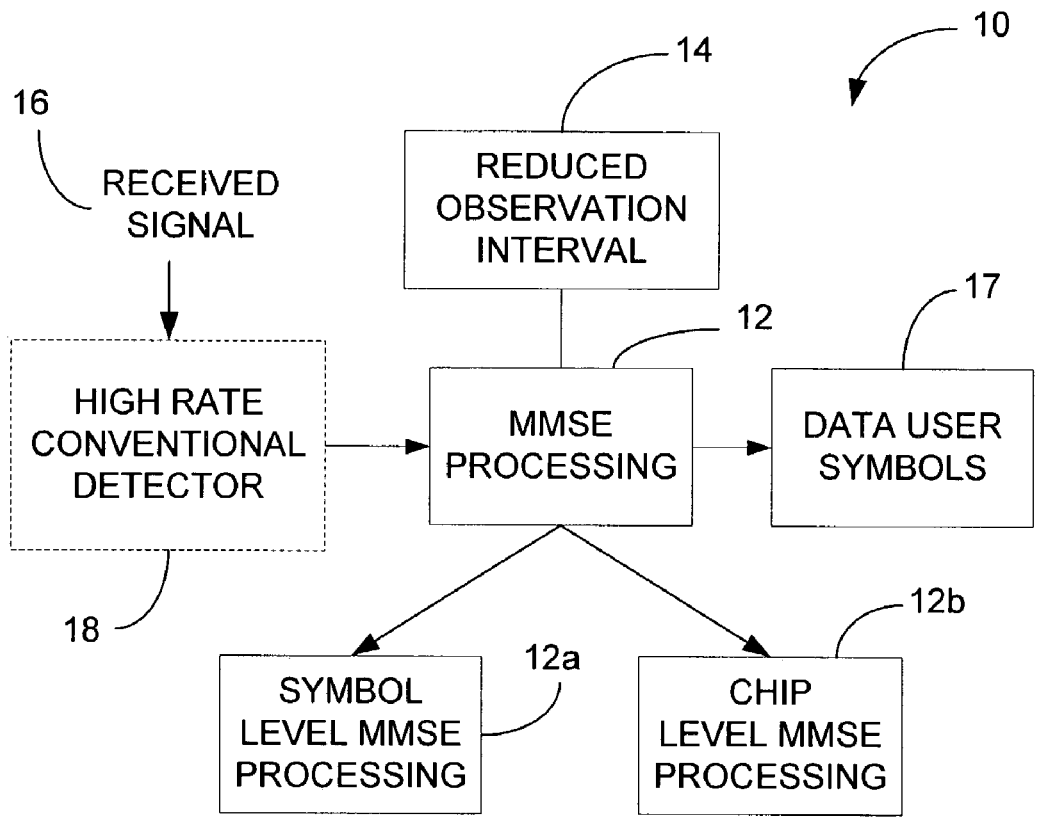
FIG. 1 shows a block diagram of an embodiment of a multiuser detector.

FIG. 1 shows a detector 10 for detecting data in a received signal 16 of a multirate DS-CDMA communication system. Channels in the received signal 16 may be de-spread with the channels' code waveforms via the conventional detector 18, (bank of correlators, i.e., matched filters). The detector 10 uses MMSE processing 12 over a reduced observation interval 14 to detect one or more data users 17 within the received signal 16. The received signal 16 may include data users having a range of user rates. For example, in a system having two user rates, the high-rate users may be detected in the presence of low-rate users or the low-rate users themselves may be detected. The MMSE processing 12 may be conducted at both the symbol level 12a and the chip level 12b. For symbol-level MMSE processing, the soft symbol outputs of the conventional detector 18 are passed to the MMSE processor 12a. For chip-level MMSE processing, the received signal is passed directly to the chip-level MMSE processor 12b.

Using a reduced observation interval translates to fewer symbols processed, which can significantly reduce the complexity of the MMSE processing.

Downlink Spreading Codes

The detector 10 may detect signals that include spreading codes that are selected because of a property that enables a reduction in complexity of multiuser detection. Such spreading codes are used in $2^{nd}$ and $3^{rd}$ generation CDMA downlink systems and their property can be described as follows for a two user-rate system. Given that we have a system with low-rate users characterized by spreading factor $SF_L=2^{m_L}$ (i.e., symbol interval and code words are $2^{m_L}$ chips), and high-rate users characterized by spreading factor $SF_H=2^{m_H}$ (i.e., symbol interval is $2^{m_H}$ chips), where $m_L>m_H$; then in the high-rate symbol interval of length $2^{m_H}$ chips there will be up to $2^{m_L-m_H}$ low-rate users that have identical high-rate (length $2^{m_H}$) code-words to within a sign change.

By utilizing the above-described spreading codes property, up to $2^{m_L-m_H}$ low-rate users can be collapsed into an "equivalent" or "effective" high-rate user. Doing so allows reducing dimensionality of the matrix manipulations inherent in MMSE linear multiuser detection.

The spreading factor property described above is present in the Orthogonal Variable Spreading Factor (OVSF) codes that are used as the downlink spreading codes of the 3GPP third generation Wideband CDMA cellular system:

$$\begin{bmatrix} c_{2^n,0} \\ c_{2^n,1} \\ c_{2^n,2} \\ \vdots \\ c_{2^n,2^n-1} \end{bmatrix} = \begin{bmatrix} c_{2^{n-1},0} & c_{2^{n-1},0} \\ c_{2^{n-1},0} & -c_{2^{n-1},0} \\ c_{2^{n-1},1} & c_{2^{n-1},1} \\ c_{2^{n-1},1} & -c_{2^{n-1},1} \\ \vdots & \vdots \\ c_{2^{n-1},2^{n-1}-1} & c_{2^{n-1},2^{n-1}-1} \\ c_{2^{n-1},2^{n-1}-1} & -c_{2^{n-1},2^{n-1}-1} \end{bmatrix} \quad \text{Eq. 1a}$$

where $c_{2^n,i}$ is the ith spreading code available with spreading factor $2^n$, (a vector of length $2^n$), and where $c_{1,0}=1$. In order to efficiently allocate the above codes in a multirate system, users codes are assigned according to a tree structure 20 shown in FIG. 2.

If any node of the tree 20 has been assigned to a user, none of the nodes underneath can be utilized. Thus, user code assignments are grouped in the smallest possible sub-tree structure. The orthogonal Walsh spreading codes that are currently being used on the IS-95 CDMA and cdma2000 downlinks are essentially equivalent to the above codes. The codes described here also have the property of being orthogonal. However, in the presence of multipath, the orthogonality property may be partially lost, since the code words between multipath components are not time-aligned. In addition, orthogonality may not available between downlink signals of different cells.

Eq. 1a defines the downlink spreading codes of length $2^n$ in terms of codes of length $2^{2-1}$. Expanding this for arbitrary $m_L > m_H$:

$$g_{2^{m_L},i} = \lfloor H'_{i,1} g_{2^{m_H},j} \; H'_{i,2} g_{2^{m_H},j} \; \cdots \; H'_{i,2^{m_L-m_H}} g_{2^{m_H},j} \rfloor^T \; j = 1, \quad \text{Eq. 1b}$$
$$2, \ldots, 2^{m_H} \quad i = 1, 2, \ldots, 2^{m_L-m_H}$$

where $\lfloor H'_{i,1} \; H'_{i,2} \; \ldots \; H'_{i,2^{m_L-m_H}} \rfloor$ is a column of the Walsh-Hadamard matrix transform of size $2^{m_L-m_H}$, ($H'_{i}$, $1 \in \pm 1$). (Note that x' will be used here to denote the conjugate transpose of x.) Thus, for each spread factor $2^{m_H}$ code, e.g., $g_{2^{m_H},j}$, up to $2^{m_L-m_H}$ code words of length (spread factor) $2^{m_L}$ can be generated. This, once again, illustrates the code property described above.

Based on the above discussion, $K_L$ low-rate user code words can be generated from a single high-rate user code word by the following simple matrix operation:

$$\lfloor g_{2^{m_L},1} \; g_{2^{m_L},2} \; \cdots \; g_{2^{m_L},K_L} \rfloor = D(g_{2^{m_H},j}) H_{K_L} \quad \text{Eq. 1c}$$

$$= \begin{bmatrix} [g_{2^{m_H},j}] & & 0 \\ & [g_{2^{m_H},j}] & \\ 0 & & [g_{2^{m_H},j}] \end{bmatrix} H_{K_L}$$

where $H_{K_L}$ a matrix containing $K_L$ columns of a Walsh Hadamard transform of order $2^{m_L-m_H}$, and $D(g_{2^{m_H},j})$ contains $2^{m_L-m_H}$ columns, with each successive column containing the identical spread-factor $2^{m_H}$ code shifted down by an additional $2^{m_H}$ chips.

The quantity of user rates in the system may be generalized to an arbitrary number of possible rates. In other words, a single spreading code of spread-factor $2^m$ can generate: $2^{m_1-m}$ codes of length $2^{m_1}$, $2^{m_2-m}$ codes of length $_2 m_2$, etc., for $m_i > m$. Similarly, by breaking the information up into smaller observation intervals of length $2^m$, up to $2^{m_1-m}$ users of spread-factor $2^{m_L}$ map ("collapse") into a single "effective" high-rate user of spread-factor $2^m$, and up to $2^{m_2-m}$ users of spread-factor $2^{m_2}$ map ("collapse") into a single "effective" high-rate user of spread-factor $2_m$, etc.

An embodiment describes the limited case in which the detector detects a received signal that includes two user rates: high-rate (spread-factor $2^{m_H}$) and low-rate (spread-factor $2^{m_L}$). It should be understood that a virtually unlimited number of user rates may be included in the received signal.

STAP and FEC

The receiver methods described here may include multi-antenna space-time adaptive processing (STAP) and forward error correction (FEC) coding. Thus, the receiver algorithms described here can be preceded by a front-end STAP processing (i.e., the linear transformation can be applied after the STAP combining of the different antenna received signal streams). The receiver algorithms may also be used in conjunction with FEC coding such that the linear transformations discussed here provide improved soft values for the coded symbol stream, which are then fed into the FEC decoder to recover the information bits.

Interference Cancellation

The receiver methods described here may be used in conjunction with interference cancellation methods. For example, the inputs to the algorithms described here can include the output of an interference cancellation algorithm where the received signal (in the case of chip-level processing) or the conventional detector outputs (in the case of symbol-level processing) are first "cleaned" of some of the interfering signals, i.e., the interference is estimated and subtracted out. Alternatively, interference may also be estimated and subtracted out at the outputs of the receiver algorithms described here.

Multirate Multiuser Systems and Symbol-Level Processing

Figure 3A:
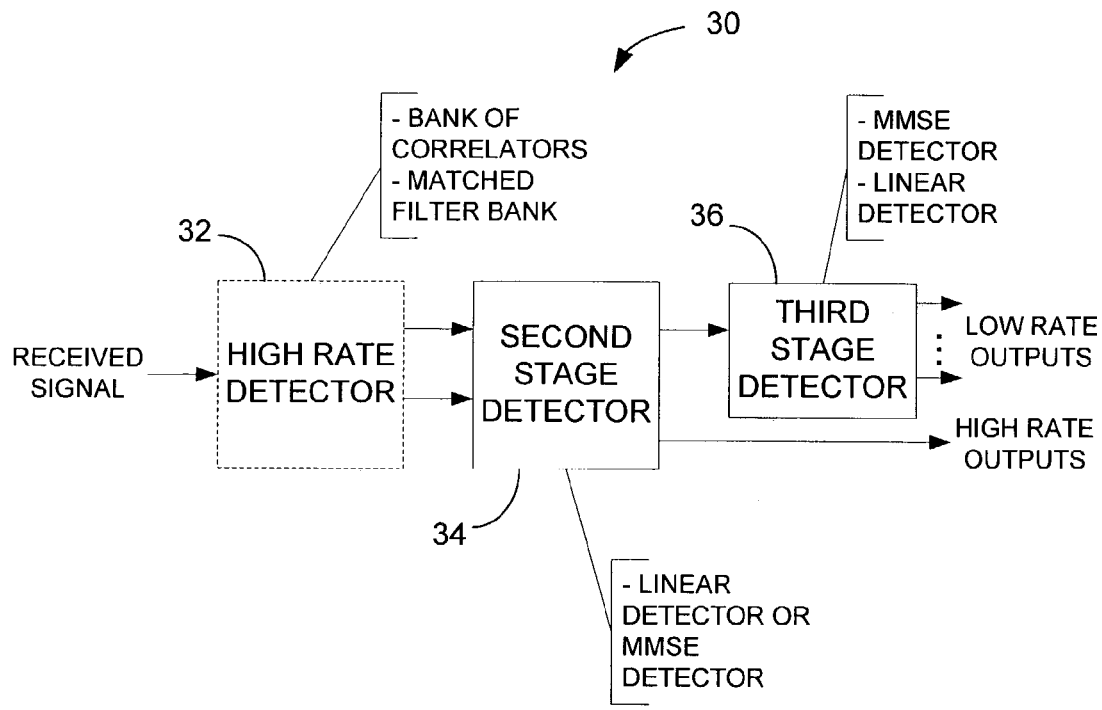
FIG. 3A shows a flow chart of the operation of an embodiment of a symbol-level detector.

FIG. 3A shows one aspect of a symbol-level detector 30 in accordance with the principles of the invention. The symbol-level detector 30 includes three stages to detect high-rate and low-rate users. The first stage is a high rate detector 32 that is applied at the high symbol rate to the received signal to process the low-rate users as well as the high-rate users. Because of the spreading code properties described earlier, multiple low-rate users collapse into a single "effective" high-rate user in the high-rate processing interval. The high rate detector 32 generates soft outputs for the actual high-rate users and the effective high-rate users. The high rate detector 32 may be any linear filter including a bank of correlators, and a matched filter bank, (i.e., the conventional detector for each user).

The second stage 34 applies a high-rate linear MMSE transformation to the high-rate outputs of the first stage to produce new soft outputs for the high-rate users and the effective high-rate users, where these outputs will be decoupled to an extent from one another. The linear MMSE transformation serves to minimize the mean square error between the actual transmitted symbols and the output of the transformation. The third stage 36 then applies a linear MMSE transformation to the group of effective high-rate soft outputs of the second stage 34 over the low-rate interval, in order to decouple the low-rate user data embedded in the effective high-rate user outputs. One of the second and third stages 34 and 36 may also be any linear detector. The functions of the second stage 34 and the third stage 36 may be interchanged in different embodiments.

Figure 3B:
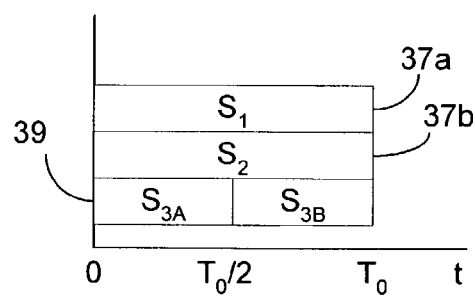
FIG. 3B shows a timing diagram of a received signal that may be detected by the symbol-level detector.

FIG. 3B shows a timing diagram of a received signal that may be detected by a symbol-level detector 30. The exemplary received signal shows a 3 user synchronous system, where the code waveforms of two of the users 37a and 37b have a spreading factor of 4, and the code word of the third user 39 has a spreading factor of 2, (i.e., the third user has twice the data rate of the first two users). The symbol time of the low-rate users 37a and 37b is $T_0$ and the symbol time of the high rate user 39 is $T_0/2$. For an observation interval of $T_0$, the received signal can be written as:

$$r = GAd + n \quad \text{Eq. 2a}$$

$$= \begin{bmatrix} [g_1] & [g_2] & \begin{bmatrix} [g_{3A}] & [0] \\ [0] & [g_{3B}] \end{bmatrix} \end{bmatrix} \begin{bmatrix} A_1 & 0 & 0 & 0 \\ 0 & A_2 & 0 & 0 \\ 0 & 0 & A_{3A} & 0 \\ 0 & 0 & 0 & A_{3B} \end{bmatrix} \begin{bmatrix} d_1 \\ d_2 \\ d_{3A} \\ d_{3B} \end{bmatrix} + n$$

where $g_i$ is the code word of symbol i. Similarly, the outputs of the conventional detector can be written as $$y = RAd + z \quad \text{Eq. 2b}$$

$$= \begin{bmatrix} 1 & \rho_{1,2} & \rho_{1,3A} & \rho_{1,3B} \\ \rho_{2,1} & 1 & \rho_{2,3A} & \rho_{2,3B} \\ \rho_{3A,1} & \rho_{3A,2} & 1 & 0 \\ \rho_{3B,1} & \rho_{3B,2} & 0 & 1 \end{bmatrix} \begin{bmatrix} A_1 & 0 & 0 & 0 \\ 0 & A_2 & 0 & 0 \\ 0 & 0 & A_{3A} & 0 \\ 0 & 0 & 0 & A_{3B} \end{bmatrix} \begin{bmatrix} d_1 \\ d_2 \\ d_{3A} \\ d_{3B} \end{bmatrix} +$$

$$\begin{bmatrix} z_1 \\ z_2 \\ z_{3A} \\ z_{3B} \end{bmatrix}$$

where $\rho_{i,j}$ is the correlation between the code words of symbols i and j. The symbols of all users can be recovered by applying a linear transformation to these outputs. For example, if we apply a decorrelating detector, then we obtain the following soft outputs for each user symbol:

$$y_{dec} = Ad + z_{dec} \quad \text{Eq. 3}$$

Note that in this case, where there is a synchronous channel, $T_0$ is the ideal observation interval needed for optimal detection.

Alternatively, a smaller observation interval for suboptimal reduced complexity detection can be used. If the observation interval is $T_0/2$, for the first interval:

$$y[1] = R[1]A[1]d[1] + z[1] \quad \text{Eq. 4}$$

$$= \begin{bmatrix} 1 & \rho_{1A,2A} & \rho_{1A,3A} \\ \rho_{2A,1A} & 1 & \rho_{2A,3A} \\ \rho_{3A,1A} & \rho_{3A,2A} & 1 \end{bmatrix} \begin{bmatrix} A_1 & 0 & 0 \\ 0 & A_2 & 0 \\ 0 & 0 & A_3 \end{bmatrix} \begin{bmatrix} d_1 \\ d_2 \\ d_{3A} \end{bmatrix} +$$

$$\begin{bmatrix} z_1 \\ z_2 \\ z_{3A} \end{bmatrix}$$

and a similar equation can be written for the second interval as well.

A linear transformation can be applied separately for each $T_0/2$ interval to reduce the MAI and recover the data. For the high-rate user, one symbol is recovered in each interval. For the low-rate user, half of a symbol is recovered in each interval, and maximal ratio combination between them can be used to produce an estimate of the symbol. For example, if the decorrelating detector approach is applied to the two intervals of FIG. 3B then, $$y_{dec}[1] = R[1]^{-1} y[1]$$

$$y_{dec}[2] = R[2]^{-1} y[2]$$

and user 1's symbol may be recovered from:

$$\hat{d}_1 = \text{sgn}\left\{ \frac{y_{dec}[1]_1}{R[1]_{1,1}^{-1}} + \frac{y_{dec}[2]_1}{R[2]_{2,2}^{-1}} \right\} \quad \text{Eq. 6}$$

where the subscripts are vector/matrix indices, and [j] refers to interval j. Although this approach is suboptimal, by reducing the size of our observation interval (i.e, operating at the high-rate user rate), we reduced the order of R is reduced from 4 in Eq. 7, to 3 in Eq. 10. Since matrix inversion increases in complexity on the order of $N^3$, where N is the order of the matrix. Here, this reduces we have reduced the complexity of the linear multiuser detection, and reduces detection delay for the high rate user by $T_0/2$. For high-rate users which are many times the data rate of the lowest rate user, the complexity savings may be substantial. For example, in a dual-rate system with high-rate users at M times the data rate of the low-rate users, opting for the high-rate one-shot decorrelator described above reduces the interfering symbols in the observation interval (as well as the dimensionality of the correlation matrix, R) by M−1 for each high-rate user.

Note that instead of taking the sign of the quantity in parenthesis in Eq. 6, i.e., making a "hard decision", we can pass its "soft" value to a decoder for FEC decoding. The improved "soft decisions" for the coded symbols can then lead to improved decoding of the underlying information bits.

Received Signal Model

Assume that a single spreading code of length (spread-factor) $2^{m_L}$ chips is used to generate $K_L$ user codes of length $2^{m_L}$ chips, as described in Eq. 1c, where (without loss of generality) $K_L \leq 2^{m_L - m_H}$. Assume also that there are $K_H$ high-rate users of spread-factor $2^{m_H}$, and for generality, that there is an other-cell user as well, (which will be denoted by the subscript "oc"). The model described here accommodates multiple other-cell users as well. The received signal can, therefore, be expressed as $$r = [r[1]^T r[2]^T \ldots r[2^{m_H - m_L}]^T]^T \quad \text{Eq. 7}$$

where r[j] is a vector of the received signal chip samples in the jth $2^{m_L}$-chip subinterval, and it can be expressed as $$r[j] = [g_{2^{m_H}}^{(L)} \; g_{2^{m_H},1} \; g_{2^{m_H},2} \; \cdots \; g_{2^{m_H},K_H} \; g_{oc}[j]] \quad \text{Eq. 8}$$

$$\begin{bmatrix} \sum_{i=1}^{K_L} A_i^{(L)} d_i^{(L)} H'_{K_L,i,j} \\ A_1^{(H)}[j] d_1^{(H)}[j] \\ A_2^{(H)}[j] d_2^{(H)}[j] \\ \vdots \\ A_{K_H}^{(H)}[j] d_{K_H}^{(H)}[j] \\ A_{oc}[j] d_{oc}[j] \end{bmatrix} + n[j]$$

$$= G[j] \times [j] + n[j]$$

where $A_i^{(L)}$ and $d_i^{(L)}$ are the amplitude and data of the ith low-rate user, respectively; $A_i^{(H)}[j]$ and $d_i^{(H)}[j]$ are the amplitude and data of the ith high-rate user in the jth (high-rate) $2^{m_H}$-chip subinterval; G[j] is the code matrix of order $2^{m_H} \times (K_H + 2)$, with each column containing a different code word; $g_{2^{m_H}}^{(L)}$ is an arbitrary spread-factor $2^{m_H}$ seed code that is used to generate the $K_L$ spread-factor $2^{m_L}$ low-rate user codes as in Eq. 1c, (although $g_{2^{m_H}}^{(L)} \notin g_{2^{m_H},1} \ldots g_{2^{m_H},K_H}$); the other-cell user code, depends on the subinterval j because this assumes inter-cell users do not enjoy the code property described above; n[j] contains the noise samples over the jth high-rate subinterval. As can be seen, the low-rate users can be modeled as a single effective high-rate user, (which follows from Eq. 1c).

An alternative way to model the other-cell users that may be useful is to utilize a separate code matrix for each base station. Here, $$G[j] = \sum_{b}^{numBS} G_b[j]$$

This approach allows smaller matrices. It is particularly helpful for the chip level processing approaches to be described later, where the cross-terms between code matrices of different base stations can be ignored in the absence of soft-handoff, (because of the structure of the chip level MMSE transform and because the data is likely uncorrelated).

Figure 2:
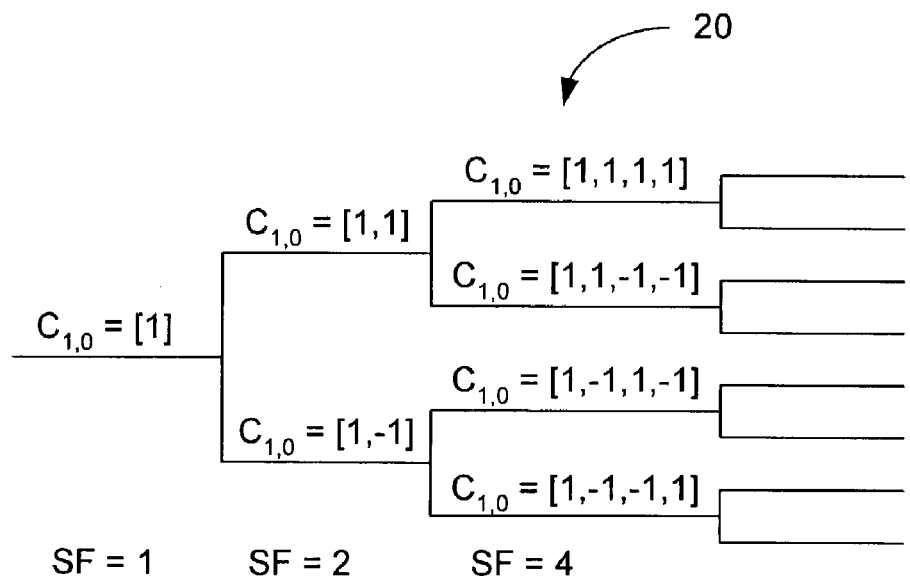
FIG. 2 shows a representation of input signals in a multiuser detector.

Note that the model described here directly extends to cases where $K_L > 2^{m_L - m_H}$ or where the low-rate user codes do not all share the same seed $2^{m_H}$ code, (i.e., the low-rate user codes do not share the same root node at the spread-factor $2^{m_H}$ level of the code tree described in FIG. 2). In this case the low-rate users would simply map to more than one effective high-rate user. Thus, without loss of generality, we can focus here on the case of $K_L \leq 2^{m_L - m_H}$ with all users deriving from a single high-rate seed code word.

Matched-Filter Outputs, Symbol Level Processing

The output of the matched-filter (i.e., correlator) outputs for all users for the jth interval can be expressed as $$y[j] = G'[j]r[j] \quad \text{Eq. 9}$$
$$= G'[j]G[j] \times [j] + G'[j]n[j]$$
$$= R[j] \times [j] + z[j]$$

where G[j] and x[j] are defined in Eq. 8, and R[j]=G'[j]G[j] is the correlation matrix, (which is conjugate symmetric). Again, G' is the conjugate transpose of G. Eq. 9 provides the soft conventional detector output for the $K_H$ high-rate users, the effective high-rate user (representing the collapsed low-rate users), and the other-cell user.

Multipath

Another embodiment relates to multipath. The model can easily extend to accommodate multipath channels. Equations 8 and 9 can be modified to define the code matrix G[j]. To incorporate multipath, the code matrix is expressed as $$G[j] = \sum_{p=1}^{P} C[j]_p W[j]_p \quad \text{Eq. 10}$$

where $W[j]_P$ is a diagonal matrix including the complex channel weights of all users for multipath p in high-rate subinterval j. The columns of $C[j]_P$ contain the code vectors shifted vertically according to the relative timing of the path p. In other words, this essentially convolves each code word with the channel impulse response to get a new "equivalent" code word. Note that if all signals originate from the same point, as in the intra-cell cellular downlink, then all users will have the same complex channel weights; in this case $W[j]_p$ in Eq. 10 will be a scalar.

Note that this method of handling multipath also applies to any asynchronous user signals, (e.g., other-cell users), where the corresponding code words are simply shifted vertically in its code matrix column according to its relative delay.

Non-Integer Chip Delays

The vectors of the above system model were defined based on chip-spaced samples. The model, however, applies equally as well to sub-chip spaced samples. This allows us to model non-integer chip delays between paths or users, as occurs in realistic multipath scenarios. The downside to this approach is that the order of a number of the vectors and matrices increases significantly, which increases computational complexity.

In order to work with chip-spaced samples while still modeling non-integer chip delays, the code word can be approximated with chip-spaced sample values by straightforward interpolation:

$$g_p = \sum_{n=-N/2}^{N/2} h_{Int}(n, \theta_p) * w_p * g_{p,n} \quad \text{Eq. 11}$$

where $g_p$ is some code vector corresponding to a single path p, with complex channel weight $w_p$; N+1 is the number of taps used in the interpolation; $h_{Int}(n,\theta_p)$ are the chip-spaced interpolation filter taps sampled (from the underlying sample-spaced interpolation filter) at appropriate sample offset phase $\theta_p$; $g_{p,n}$ is the $g_p$ code vector shifted in time by n chips. Note that the chip-spaced code words can be considered to be the linear sum of several chip-spaced "virtual" paths, delayed and weighted to approximate the underlying non-chip-spaced code word samples.

Edge Effects

As previously indicated, reducing the observation interval to one symbol, (possibly even just one high-rate symbol interval) causes degradation in performance, since the overlapping symbols are not totally taken into effect, and the neighboring symbols are completely ignored, (often referred to as "Edge Effects"). This degradation may be particularly experienced where the multipath delay profile is large, and symbols of one path substantially overlap one or more previous/successive symbols of another path. Therefore, the observation interval can be increased to improve performance, and optimize the tradeoff between performance and complexity. The system model described in this section directly extends to a larger observation window, by modifying the code matrix, G[j] and the data vector, x[j] in Eq. 8. For example, if the observation window is extended to take into account one high-rate previous symbol, and one successive high-rate symbol, then the received signal can now be expressed as:

$$r[j] = \begin{bmatrix} \begin{bmatrix} G[j](-1) \end{bmatrix} & & 0 \\ & \begin{bmatrix} G[j](0) \end{bmatrix} & \\ 0 & & \begin{bmatrix} G[j](+1) \end{bmatrix} \end{bmatrix} \begin{bmatrix} x[j](-1) \\ x[j](0) \\ x[j](+1) \end{bmatrix} + n[j] \quad \text{Eq. 12}$$

$$= G[j] \times [j] + n[j]$$

where G[j](−1), G[j](0), and G[j](+1) contain the code waveforms corresponding to the observation window intervals previous to the desired symbol interval, equal to the desired symbol interval, and successive to the desired symbol interval, respectively. Note that the code vectors in the columns of G[j](−1) and G[j](+1) do not necessarily extend over a whole symbol interval—the extension of the observation interval window in each direction does not need to be done in integer-symbol increments.

Higher Rate Users

The model up until now has been described such that there are no users at a higher-rate than the rate used to establish the processing interval. However, the model can easily be extended to accommodate higher-rate users as well. For example, assume that the high-rate processing interval is $2^{m_H}$ chips, but that there is a higher-rate user with symbol interval equal to $2^{m_{H2}}$ where $2^{m_{H2}}=2^{m_H}/N$, (i.e., with symbol rate N times higher, or equivalently, symbol interval N times smaller). Incorporating this higher-rate user into the model of Eq. 8 would simply mean adding N columns to G[j], (with each successive higher-rate code word shifted down by $2^{m_{H2}}$ chips):

$$G[j] = \begin{bmatrix} g_{2^{m_H}}^{(L)} & g_{2^{m_H},1} & g_{2^{m_H},2} & \cdots & g_{2^{m_H},K_H} & g_{oc}[j] \end{bmatrix} \begin{bmatrix} g_{2^{m_H},1} \\ 0 \\ \vdots \end{bmatrix} \begin{bmatrix} 0 \\ g_{2^{m_H},2} \\ 0 \\ \vdots \end{bmatrix} \cdots \begin{bmatrix} \vdots \\ 0 \\ \vdots \\ g_{2^{m_{H2}},N} \end{bmatrix}$$

and an additional N values in x[j] corresponding to the N higher-rate symbols that appear in high-rate processing interval.

Figure 4A:
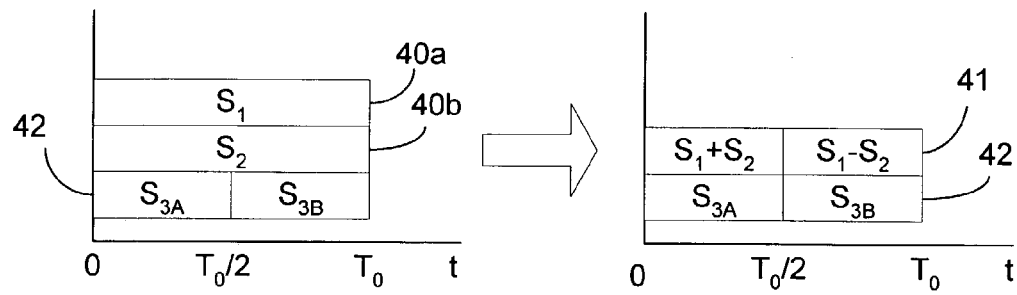
FIG. 4A shows a representation of an exemplary multirate system.
Figure 4B:
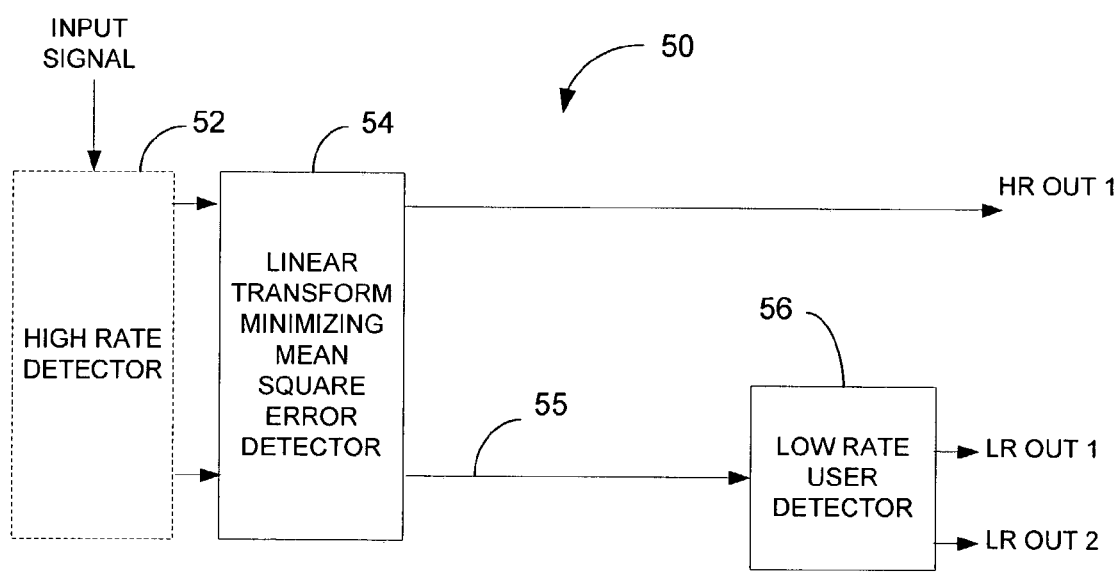
FIG. 4B shows a block diagram of an embodiment of a multiuser detector.

FIGS. 4A and 4B show an aspect of another detector 50. FIG. 4A shows a representation of an exemplary multirate system in which two low rate users 40a-40b are collapsed into an effective high rate user 41. The system also includes one actual high rate user 42. The exemplary system is limited to three users merely to improve the clarity of the description of the detector 50. The detector 50 is not limited to any number of low-rate users and high-rate users. The low rate users 40a-40b each may have a spreading factor of 4, while the actual high rate user 42 has a spreading factor of 2. The symbol time of each of the low rate users 40a-40b is $T_0$, and the symbol time of the high rate user 42 is $T_0/2$.

FIG. 4B shows an aspect of the detector 50. A high-rate user may be detected by applying a form of the MMSE criterion to the jth high-rate subinterval, (i.e., a "high-rate" MMSE detector). Both symbol level processing and chip level processing may be applied for detecting users. For symbol level processing, the detector may include a high rate detector 52 to generate soft outputs from the received signal. An MMSE detector 54 operates as the second stage and a linear detector 56 as the third stage. The MMSE detector 54 applies a linear transformation to the soft outputs for a single high-rate symbol interval to decouple the actual and effective high rate users, deriving improved soft symbol outputs for each high rate user. Each of the actual high rate user outputs of the MMSE detector 54 represent soft outputs of the detected data corresponding to actual high rate user. The effective high rate user outputs of the MMSE detector 54 represent a combination of the underlying collapsed low-rate users.

For chip level processing, the detector 50 may not include the high rate detector 52. Instead, the MMSE detector 54 applies the MMSE linear transformation directly to the input signal.

High Rate User Symbol Level Processing

An MMSE linear transformation may be applied to the conventional detector soft symbol outputs in order to derive improved soft symbol outputs for each user. The MMSE linear transformation for each subinterval, L[j], to apply is derived by minimizing the MSE $$E|x[j]-L[j]y[j]|^2 \qquad \text{Eq. 13}$$

The following derivation omits the reference to the subinterval.

$$E|x-Ly|^2 = E|(x-Ly)'(x-Ly)| \qquad \text{Eq. 14}$$
$$= E|(x'(I-R'L')-n'GL')((I-LR)x-LG'n)|$$
$$= E|(x'(I-RL')(I-LR)x+n'GL'LG'n)|$$

-continued $$= Tr[(I-RL')(I-LR)\overline{xx'}+\sigma^2 GL'LG']$$
$$= Tr[I+RL'LRP-RL'P-LRP+\sigma^2 RL'L]$$

where both E(.) and the over-bar refer to the expectation operation, and Tr(.) refers to the trace (of a matrix). Minimizing the above expression with respect to L[j] yields:

$$L[j]=(R[j]+\sigma^2 P[j]^{-1})^{-1} \qquad \text{Eq. 15}$$

where P[j] is a diagonal matrix of powers that can be shown to be $$P[j] = E(x[j]x[j]') \qquad \text{Eq. 16}$$
$$= diag\left(\sum_{i=1}^{K_L} |A_i^{(L)}|^2 \ |A_1^{(H)}[j]|^2 \ |A_2^{(H)}[j]|^2 \cdots \right.$$
$$\left. |A_{K_H}^{(H)}[j]|^2 \ |A_{oc}[j]|^2\right)$$

Implicit in the above equation is the assumption that all entries of x[j] are uncorrelated, (i.e., the data of all users are uncorrelated with each other). This assumption leads to the diagonal character of the matrix P[j]. This assumption is not true, however, in a number of cases: (1) If soft handoff users exist between base stations, then some of the data streams are identical, or (2) If the processing interval extends longer than a single high-rate symbol then the low-rate user data will be identical for the multiple high-rate subintervals. We may extend the processing interval to be longer than a single high-rate symbol interval in order to take into account edge effects, or we may simply do so to take into account multipath delay spread that causes the high-rate symbols to extend and overlap with one another. In these cases, some of the entries in x[j] may be correlated with one another and thus, P[j] may no longer be a diagonal matrix. As an example, we consider that the observation interval takes into account at least part of one previous symbol and one successive symbol, (but no soft-handoff). Here, Eqs. 12 and 16, can be rewritten as:

$$P[j] = \begin{bmatrix} \overline{x[j](-1)x[j](-1)'} & \overline{x[j](-1)x[j](0)'} & \overline{x[j](-1)x[j](+1)'} \\ \overline{x[j](0)x[j](-1)'} & \overline{x[j](0)x[j](0)'} & \overline{x[j](0)x[j](+1)'} \\ \overline{x[j](+1)x[j](-1)'} & \overline{x[j](+1)x[j](0)'} & \overline{x[j](+1)x[j](+1)'} \end{bmatrix} \quad \text{Eq. 17}$$

The diagonal elements of P[j] will be:

$$\text{Diagonal Elements} = \begin{bmatrix} \sum_{i=1}^{K_L} |A_i^{(L)}[j](-1)|^2 \\ |A_1^{(H)}[j](-1)|^2 \\ \vdots \\ |A_{K_H}^{(H)}[j](-1)|^2 \\ |A_{oc}[j](-1)|^2 \\ \sum_{i=1}^{K_L} |A_i^{(L)}(0)|^2 \\ |A_1^{(H)}[j](0)|^2 \\ \vdots \\ |A_{K_H}^{(H)}[j](0)|^2 \\ |A_{oc}[j](0)|^2 \\ \sum_{i=1}^{K_L} |A_i^{(L)}[j](+1)|^2 \\ |A_1^{(H)}[j](+1)|^2 \\ \vdots \\ |A_{K_H}^{(H)}[j](+1)|^2 \\ |A_{oc}[j](+1)|^2 \end{bmatrix} \quad \text{Eq. 18}$$

-continued $$d_i^{(L)}[j](-1) = d_i^{(L)}(0),$$

$$A_i^{(L)}[j](-1) = A_i^{(L)}(0),$$

for $j = 2, 3, \ldots 2^{m_L - m_H}$ where $$d_i^{(L)}[j](+1) = d_i^{(L)}(0),$$

$$A_i^{(L)}[j](+1) = A_i^{(L)}(0),$$

for $j = 1, 2, 3, \ldots 2^{m_L - m_H} - 1$ and the off-diagonal elements are all zero except for the following:

for $j = 2, 3, \ldots, 2^{m_L - m_H}$ : $\quad$ Eq. 19

$$\overline{x[j](-1)_1 x[j](0)_1^*} = \overline{x[j](0)_1 x[j](-1)_1^*} = \sum_i^{K_L} |A_i^{(L)}(0)|^2 H'_{K_L,i,j} H'_{K_L,i,j-1}$$

for $j = 1, 2, 3, \ldots, 2^{m_L - m_H} - 1$ :

$$\overline{x[j](0)_1 x[j](+1)_1^*} = \overline{x[j](+1)_1 x[j](0)_1^*} = \sum_i^{K_L} |A_i^{(L)}(0)|^2 H'_{K_L,i,j} H'_{K_L,i,j+1}$$

for $j = 2, 3, \ldots, 2^{m_L - m_H} - 1$ :

$$\overline{x[j](-1)_1 x[j](+1)_1^*} = \overline{x[j](+1)_1 x[j](-1)_1^*} = \sum_i^{K_L} |A_i^{(L)}(0)|^2 H'_{K_L,i,j-1} H'_{K_L,i,j+1}$$

where $x[j](-1)_1$, $x[j](0)_1$, $x[j](+1)_1$ are the first elements of the vectors implicitly defined in Eq. 12, and which contain the effective high-rate user data, (for the collapsed low-rate users) for the previous, current, and successive high-rate symbol subintervals, respectively.

The solution to Eq. 13 can also be derived from the classic form of MMSE solutions, as shown below. Once again, temporarily the reference to the subinterval is dropped. Thus, the solution to the minimization of $E|x-Ly|^2$ where $y=Rx+z$, is:

$$L' = E[yy']^{-1} E[yx'] \quad \text{Eq. 20}$$

where $$E[yy'] = R\overline{xx'}R + \overline{zz'} = RPR + \sigma^2 R \quad \text{Eq. 21}$$

$$E[yx'] = R\overline{xx'} = RP \quad \text{Eq. 22}$$

where xx' is given in Equation 16 when considering only one symbol, (no edge effects), and Eqs. 17-19, when taking 3 symbols into account, (fully or partially).

Note that for the high-rate users, minimizing the cost function $E|x-Ly|^2$ (as in Eq. 13) gives the same result as minimizing the cost function $E|d-Ly|^2$, since the high-rate user entries in x are decoupled from other users. This may not be the case, however, for low-rate users, (where a number of low-rate users are combined into a single entry in x); thus, the latter cost function will be used later when addressing detection of the low-rate users.

High Rate User Chip Level Processing

A MMSE linear transformation may be applied directly to the received signal, without the front-end conventional detector. Here the linear transformation, v[j], is derived that minimizes the following quantity.

$$E|d_i^{(H)}[j] - v[j]'r[j]|^2 \qquad \text{Eq. 23}$$

The solution to this can be shown to be:

$$v[j] = (E[r[j]r[j]'])^{-1} E[r[j]d_i^H[j]^*] \qquad \text{Eq. 24}$$
$$= (G[j]P[j]G'[j] + \sigma^2 I)^{-1} A_i^{(H)}[j] g_{2^{m_H},1}$$

Note that if taking into account neighbor symbols (fully or partially), then P[j] in Eq. 24 above is defined according to Equations 17-19.

Figure 5:
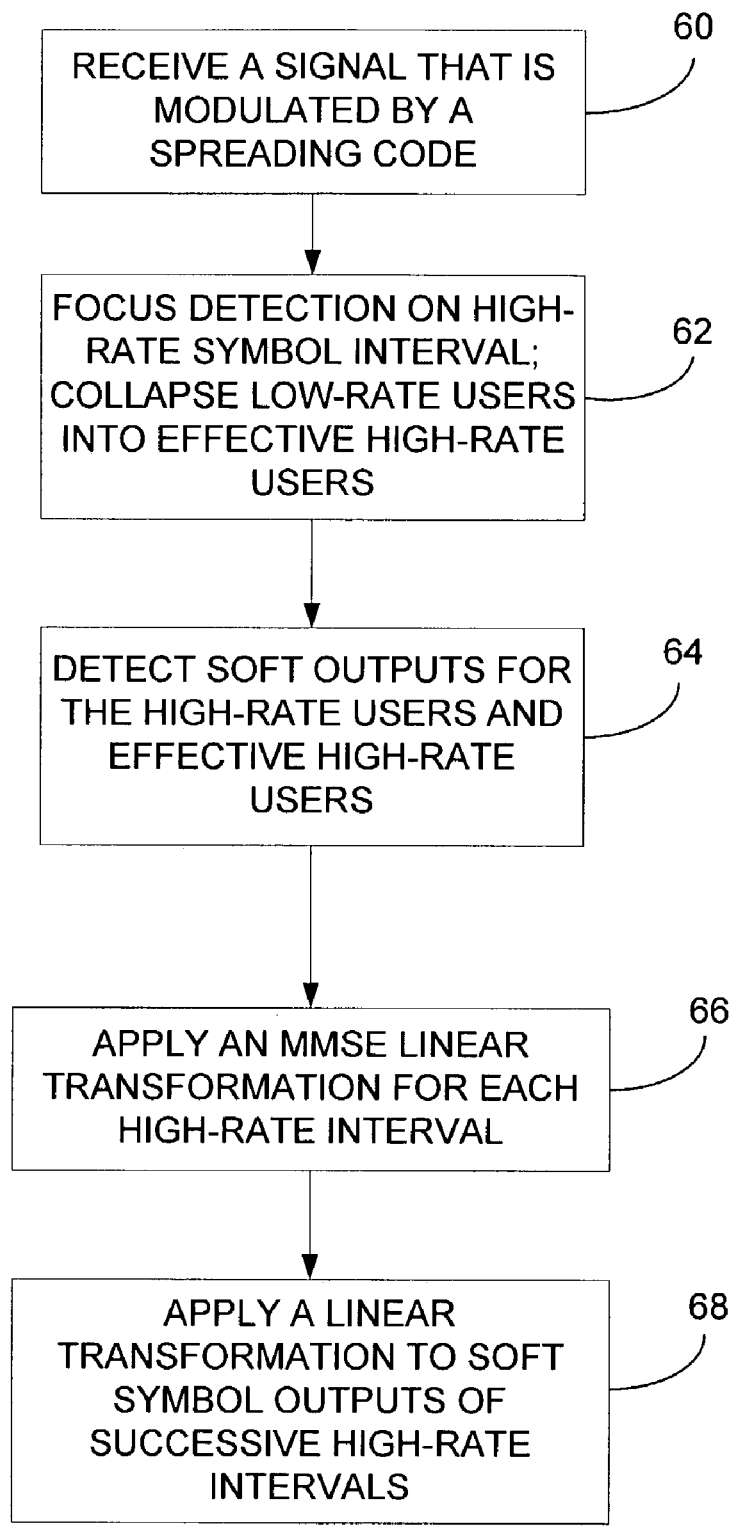
FIG. 5 shows a flow chart of the operation of an embodiment of a multiuser detector.

FIG. 5 shows a flow chart of the operation of detector 50. Starting at block 60, a signal that is modulated by a spreading code such as in a CDMA system is received. The signal includes actual high-rate users and low-rate users. Continuing on to block 62, the signal is decoded using the high symbol rate for the low-rate users as well as the high-rate users. The low-rate users are collapsed (i.e. modeled as) into one or more effective high-rate users. At block 64, soft outputs may be detected for the actual high-rate users and the effective high-rate users, (for the case of symbol-level processing). Continuing on to block 66, an MMSE linear transformation is applied to the soft outputs for a high-rate symbol interval to decouple the actual and effective high rate users generating soft outputs. The resulting decoupled actual high rate user soft outputs represent the detected data of the corresponding actual high rate users. The decoupled effective high rate user soft outputs represent a combination of the underlying collapsed low-rate users. Finishing at block 68, a linear transformation may be applied over successive intervals of the effective high-rate user soft outputs to decouple the low-rate users embedded in the effective high-rate user soft outputs. For the case of chip-level processing, an MMSE linear transformation 66 would be applied directly to the received signal, bypassing the initial detector 64.

Low Rate User Symbol Level Processing

Another embodiment uses techniques for recovering the low-rate users from the soft outputs of the high-rate front-end conventional correlator (matched-filter) detector for all users. Instead of one MMSE processing window over the entire low-rate symbol interval, (1) the MMSE processing is done over several separate smaller windows, (2) and used to obtain an MMSE estimate for the low-rate user for each processing sub-interval, (3) these estimates are combined for the low-rate user in some way. In other words, we can take the $2^{m_L-m_H}$ outputs from the high-rate MMSE processing for the low-rate users and combine them in some way to get an estimate of the low-rate user. The outputs from the high-rate MMSE processing for the low-rate users follow from the minimization of the cost function $$E|d_i^{(L)} - L[j]y[j]|^2$$

Thus, we can write (dropping the reference to the jth subinterval for convenience)

$$L' = E[yy']^{-1} E[yd_i^{(L)^*}]$$
$$= (RP + \sigma^2 I)^{-1} p$$

where $$E[yy'] = R\overline{xx'}R + \overline{zz'} = RPR + \sigma^2 R$$
$$E[yd_i^{(L)^*}] = R\overline{xd_i^{(L)^*}} = Rp$$

and where p is a vector such that the only non-zero entries in p correspond to the effective high-rate users in x, and the value of these non-zero entries are equal to $A_i^{(L)} H'_{k_L i,j}$. For example, if the high-rate processing window takes into account 3 high-rate symbols then $x[j] = [x[j](-1)^T x[j](0)^T x[j](+1)^T]^T$ and we have (from Eq. 8)

$$P[j] = [A_i^{(L)} H'_{K_L i,j} 0 \quad \ldots \quad 0 A_i^{(L)} H'_{K_L i,j} 0 \quad \ldots \quad 0 A_i^{(L)} H'_{K_L i,j} 0 \ldots 0]$$

for all j except j=1 and $j=2^{m_L-m_H}$, where in these two cases, p[j] would have only 2 non-zero entries (the latter two non-zero entries for j=1, and the first two non-zero entries for $j=2^{m_L-m_H}$), since the effective high-rate user for the previous and next low-rate interval is uncorrelated with $d_i^{(L)}$ of the current low-rate interval.

Method 1: Low Rate User Decoupling Combining

In each of the high-rate MMSE outputs for the low-rate user derived above, part of the low-rate symbol is recovered, i.e., we partly recover an effective high-rate user that represents some combination of the underlying collapsed low-rate users. As described below, these outputs can be combined in some way to decouple and detect the low-rate users. Using this approach allows us to apply MMSE solutions in smaller subintervals, which reduces complexity, while still recovering the low-rate users.

The output of the high-rate MMSE detector derived above for the effective high-rate user in the jth subinterval can be written as:

$$y_e[j] = L_e[j]^T y[j] \qquad \text{Eq. 25}$$
$$= L_e[j]^T R[j] x[j] + L_e[j]^T z[j]$$
$$= b_e[j]^T x[j] + z_e[j]$$

where $L_e[j]^T$ is the row of L[j] corresponding to the effective high-rate user output, (e.g., first row in Eq. 15), and $$b_e[j] = L_e[j]^T R[j] \qquad \text{Eq. 26}$$

In order to decouple the low-rate users we collect the effective high-rate user outputs for all subintervals in a vector:

$$y_e = [L_e[1]^T y[1] \; L_e[2]^T y[2] \cdots L_e[2^{m_L-m_H}]^T y[2^{m_L-m_H}]]^T \qquad \text{Eq. 27}$$
$$= [y_e[1] \; y_e[2] \cdots y_e[2^{m_L-m_H}]]^T$$

For the case of no edge effects, (only one high-rate symbol considered), and where the first entry in x[j] contains the effective high-rate user (as in Eq. 8) then we can express this as:

$$y_e = [b_e[1]_1 x[1]_1 \; b_e[2]_1 x[2]_1 \; \cdots \; b_e[2^{m_L-m_H}]_1 x[2^{m_L-m_H}]_1]^T + \quad \text{Eq. 28}$$

[Interference & Noise]$^T$ $$= diag[b_e[1]_1 \; b_e[2]_1 \; \cdots \; b_e[2^{m_L-m_H}]_1] \begin{bmatrix} x[1]_1 \\ x[2]_2 \\ \vdots \\ x[2^{m_L-m_H}]_1 \end{bmatrix} +$$

[Interference & Noise]$^T$ $= B_e x_e +$ [Interference & Noise]$^T$ $$= B_e \begin{bmatrix} \sum_{i}^{K_L} A_i^{(L)} d_i^{(L)} H'_{K_L,i,1} \\ \sum_{i}^{K_L} A_i^{(L)} d_i^{(L)} H'_{K_L,i,2} \\ \vdots \\ \sum_{i}^{K_L} A_i^{(L)} d_i^{(L)} H'_{K_L,i,2^{m_L-m_H}} \end{bmatrix} + \text{[Interference \& Noise]}^T$$

$= B_e H_{K_L} A^{(L)} d^{(L)} +$ [Interference & Noise]$^T$ where $b_e[j]_1$ and $x[j]_1$ are the first elements of the $b_e$ and $x$ vectors, which corresponds to the effective high-rate user output for the jth interval, and $H_{K_L}$ a matrix containing $K_L$ columns of a Walsh Hadamard transform of order $2^{m_L-m_H}$ (as in Eq. 1c), $A^{(L)} = \mathrm{diag}(A_1^{(L)} A_2^{(L)} \ldots A_{K_L}^{(L)})$ is a diagonal matrix containing the amplitudes of the low rate users, $d^{(L)} = [d_1^{(L)} d_2^{(L)} \ldots d_{K_L}^{(L)}]^T$ holds the symbols for the $K_L$ low-rate users (that collapsed into the effective high-rate user), $B_e$ is a diagonal matrix of size $2^{m_L-m_H} \times 2^{m_L-m_H}$ and is implicitly defined in Eq. 28 above.

$x_e$ is a vector containing the data of the effective high-rate users only (length $2^{m_L-m_H}$).

In the case where edge effects are taken into account, then the only thing that changes in Eq. 28 is that $B_e$ is no longer diagonal. For example, if we consider 3 high-rate symbols, then similar to Eq. 28 we can write:

$$y_e = \begin{bmatrix} b_e[1](0)_1 x[1](0)_1 + b_e[1](1)_1 x[1](1)_1 \\ b_e[2](-1)_1 x[2](-1)_1 + b_e[2](0)_1 x[2](0)_1 + \\ b_e[2](+1)_1 x[2](+1)_1 \\ \vdots \\ b_e[2^{m_L-m_H}](-1)_1 x[2^{m_L-m_H}](-1)_1 + \\ b_e[2^{m_L-m_H}](0)_1 x[2^{m_L-m_H}](0)_1 \end{bmatrix} + \quad \text{Eq. 29}$$

[Interference & Noise]$^T$ $$= \begin{bmatrix} b_e[1](0)_1 & b_e[1](1)_1 & & & 0 \\ b_e[2](-1)_1 & b_e[2](0)_1 & b_e[2](+1)_1 & & \\ & b_e[3](-1)_1 & b_e[3](0)_1 & b_e[3](+1)_1 & \\ & & & \ddots & \\ 0 & & & b_e[2^{m_L-m_H}](-1)_1 & b_e[2^{m_L-m_H}](0)_1 \end{bmatrix}$$

$$\begin{bmatrix} x[1](0)_1 \\ x[2](0)_1 \\ \vdots \\ x[2^{m_L-m_H}](0)_1 \end{bmatrix} + \text{[Interference \& Noise]}^T$$

$= B_e H_{K_L} A^{(L)} d^{(L)} +$ [Interference & Noise]$^T$ where $B_e$ is now block-diagonal, and $$b_e[j] = [b_e[j](-1)^T \; b_e[j](0)^T \; b_e[j](+1)^T]^T \quad \text{Eq. 30}$$

$$y[j] = [y[j](-1)^T \; y[j](0)^T \; y[j](+1)^T]^T, \quad \text{Eq. 31}$$

corresponding to $$x[j] = [x[j](-1)^T \; x[j](0)^T \; x[j](+1)^T]^T, \quad \text{Eq. 32}$$

as defined in Eq. 12, and where $$x[1](0)_1 = x[2](-1)_1; \; x[2](0)_1 = x[1](+1)_1 = x[3](-1)_1, \text{ etc.,} \quad \text{Eq. 33}$$

since the low-rate symbols span $2^{m_L-m_H}$ high-rate symbols. Another assumption is that $$y[1](0)_1 = y[2](-1)_1; \; y[2](0)_1 = y[1](+1)_1 = y[3](-1)_1, \text{ etc.} \quad \text{Eq. 34}$$

which means that the received signal samples and the code-words are used over the whole extended symbol window. In other words, if a window of +/− n high-rate symbols is processed at one time, then the received signal is processed over the entire 2n+1 symbol sliding window for each high-rate symbol. Thus, assuming that the processing window takes into account the full neighboring symbols on either side of the desired high-rate symbol being demodulated. As previously described, edge effects can also easily be taken partially into account by processing only a partial amount of the neighboring symbols. Therefore, in order to recover the low-rate users which forms:

$$y_L = H'_{K_L} B_e^{-1} y_e \quad \text{Eq. 35}$$

which decouples and recovers the low-rate data from the effective high-rate user outputs.

We can alternately express all of the above in a much more compact form. Define $$y=[y[1](-1)^T\, y[1](0)_T^T\, y[2](0)^T \ldots y[2^{m_L-m_H}](0)^T \\ y[2^{m_L-m_H}](+1)^T]^T, \qquad \text{Eq. 36}$$

$$x=[x[1](-1)^T\, x[1](0)^T\, x[2](0)^T \ldots x[2^{m_L-m_H}](0)^T x \\ [2^{m_L-m_H}](+0)^T]^T \qquad \text{Eq. 37}$$

where $$y=Rx+z \qquad \text{Eq. 38}$$

and where R contains the correlations between every pair of high-rate code words over the low-rate symbol interval, and z is the processed noise. If there are $K=K_H+2$ total high-rate users and effective high-rate users, (including one other-cell user), then y is of length $(2^{m_L-m_H}+2)K$, (assuming a 3 high-rate symbol processing window, i.e., edge effects). We also define $$\Gamma'_e = \begin{bmatrix} [L_e[1]^T] & & & \\ & [L_e[2]^T] & 0 & \\ & 0 & \ddots & \\ & & & [L_e[2^{m_L-m_H}]^T] \end{bmatrix} \qquad \text{Eq. 39}$$

where $\Gamma'_e$ is of dimension $2^{m_L-m_H} \times (2^{m_L-m_H}+2)K$, (each $L_e[j]^T$ is of length 3K for the 3 symbol window case and shifted over by an additional K elements in each successive row).

The effective high-rate symbol soft MMSE outputs can be expressed as follows:

$$\begin{aligned} y_e &= \Gamma'_e y \qquad \text{Eq. 40} \\ &= \Gamma'_e R x + \Gamma'_e z \\ &= \Gamma'_e (R_e x_e + R_{\sim e} x_{\sim e}) + z_e \\ &= \Gamma'_e R_e x_e + \Gamma'_e R_{\sim e} x_{\sim e} + z_e \\ &= B_e x_e + \Gamma'_e R_{\sim e} x_{\sim e} + z_e \end{aligned}$$

where $x_e$ is a vector (length $2^{m_L-m_H}$) which contains the data of the effective high-rate users only (for all $2^{m_L-m_H}$ intervals within the low-rate interval being processed); $x_{\sim e}$ contains the data of the remaining users; $R_e$ is a $(2^{m_L-m_H}+2)K \times 2^{m_L-m_H}$ correlation matrix, which contain the correlations of all $(2^{m_L-m_H}+2)K$ code-words with only the $2^{m_L-m_H}$ effective high-rate user code-words. $R_{\sim e}$ is the correlation matrix for the remaining users; the middle term, $\Gamma'_e R_{\sim e} x_{\sim e}$, represents the residual interference after the MMSE linear transformation is applied; $z_e$ is the post-MMSE processed thermal noise; $B_e$ is implicitly defined in the above equation as $$B_e = \Gamma'_e R_e \qquad \text{Eq. 41}$$

and is a square matrix of order $2^{m_L-m_H}$. As mentioned before, $B_e$ will be diagonal in the case when only a single high-rate symbol interval is considered for the high-rate MMSE detection. Also, in the 3-symbol window case, there will be $3*2^{m_L-m_H}-2$ non-zero entries, (as is seen in Eq. 29).

Note that Eq. 40 simply expresses Eq. 28 and Eq. 29 in a more compact form. As we saw in Eq. 28, we can express the effective high-rate user outputs as:

$$x_e = H_{K_L} A^{(L)} d^{(L)} \qquad \text{Eq. 42}$$

Therefore, in order to decouple and recover the low-rate users:

$$\begin{aligned} y_L &= H'_{K_L} B_e^{-1} \Gamma'_e y \qquad \text{Eq. 43} \\ &= H'_{K_L} B_e^{-1} y_e \end{aligned}$$

Low Rate User General Decoupling Combining

Based on the above discussion, a general form of decoupling combining (to recover the low-rate user symbol from the effective high-rate user symbol estimates) can be defined where the initial high-rate processing is done by some general linear transformation, namely:

$$\begin{aligned} y_L &= H'_{K_L} (LR_e)^{-1} L y \qquad \text{Eq. 43a} \\ &= H'_{K_L} (LR_e)^{-1} y_e \end{aligned}$$

where L is some linear transform of dimensions $2^{m_L-m_H} \times (2^{m_L-m_H}+2)K$, (for the 3-symbol window case), $y_e = Ly$ provides estimates of the effective high-rate user symbols, and $R_e$ (dimensions $(2^{m_L-m_H}+2)K \times 2^{m_L-m_H}$) was defined implicitly in Eq. 40:

$$\begin{aligned} y &= Rx + z \qquad \text{Eq. 43b} \\ &= R_e x_e + R_{\sim e} x_{\sim e} + z \end{aligned}$$

The application of $(LR_e)^{-1}L$ to y is guaranteed to decouple the effective high-rate symbols, $x_e$, and the subsequent application of $H'_{K_L}$ will combine the effective high-rate data values in such a way as to recover the low-rate data. Several special cases can be envisioned:

1. L is all zeros except for the $2^{m_L-m_H}$ columns of the identity matrix $I_{2^{m_L-m_H}}$ that are distributed in L according to the ordering of the effective high-rate users. This is equivalent to only utilizing the $2^{m_L-m_H}$ effective high-rate conventional detector outputs of y, treating all other user signals as noise, and decorrelating only the effective high-rate users. In the presence of significant interference from other users (i.e., the non-effective high-rate users) the performance of this detector will be poor.

2.

$$L = R'_e.$$

This is equivalent to applying the generalized inverse of $R_e$ to y to decouple the effective high-rate symbols $x_e$.

3.

$$L = \Gamma'_e,$$

as discussed above (e.g., Eq. 43), where the rows of $\Gamma'_e$ contain the high-rate MMSE solutions for the effective high-rate user outputs, (Eq. 39).

4. L can be chosen to minimize $$E|x_e - (LR_e)^{-1} Ly|^2$$

Method 2: Low Rate User MMSE Combining

The technique described previously applied a weight vector to $y_e$, (containing outputs for the effective high-rate user for each interval, see Eq. 43), to decouple or "decorrelate" the low rate users. In this section, we attempt to derive a weight vector that when applied to $y_e$ would minimize the following MSE $$E\left(|d_k^{(L)} - w'y_e|^2\right) \qquad \text{Eq. 44}$$

to solve for the kth low-rate user's symbol. The solution to this is $$w = \overline{(y_e y_e')}^{-1} \overline{(y_e d_k^{(L)*})} \qquad \text{Eq. 45}$$

where, based on Eq. 40, $$\overline{y_e y_e'} = \Gamma_e' \overline{yy'} \Gamma_e \qquad \text{Eq. 46}$$

$$\overline{y_e d_k^{(L)*}} = \Gamma_e' \overline{y d_k^{(L)*}} \qquad \text{Eq. 47}$$

where y and x are defined in Eqs. 36 and 37, respectively, and $\overline{yy'}$ is defined according to Equation 21, with $$P_{xx} = \overline{xx'} \qquad \text{Eq. 48}$$

The elements of $P_{xx}$ are easily expressed based on the following. The auto-correlations can be written as $$E(x[j](0)x[j](0)') = \qquad \text{Eq. 49}$$

$$\mathrm{diag}\left(\sum_{i=1}^{K_L} |A_i^{(L)}|^2 |A_1^{(H)}[j]|^2 |A_2^{(H)}[j]|^2 \cdots |A_{K_H}^{(H)}[j]|^2 |A_{oc}[j]|^2\right)$$

and the cross-correlations $$E(x[j](0)x[k](0)') = \qquad \text{Eq. 50}$$

$$\mathrm{diag}\left(\sum_{i=1}^{K_L} |A_i^{(L)}|^2 H'_{K_L,i,j} H'_{K_L,i,j} 0\, 0\, \cdots\, 0\, 0\right) j \neq k$$

The auto-correlations involving $x[1](-1)$ or $x[2^{m_L - m_H}](+1)$ have the same form as Eq. 49, except $A_i^{(L)}$ changes according to the low-rate amplitude values for the previous and successive low-rate symbols, respectively; the cross-correlations involving these terms are all zero.

The term $$\overline{yd_k^{(L)*}}$$

can be expressed as $$\overline{yd_k^{(L)*}} = R\overline{xd_k^{(L)*}} = RP_{xd} \qquad \text{Eq. 51}$$

where $P_{xd}$ is a vector of all zeros except for $2^{m_L - m_H}$ nonzero entries corresponding to $$\overline{x[j]_1 d_k^{(L)*}} = A_k^{(L)} H'_{K_L, i, j} \quad j = 1, 2, \ldots, 2^{m_L - m_H}.$$

Effectively $$w = (\Gamma_e' R P_{xx} R \Gamma_e + \sigma^2 \Gamma_e' R \Gamma_e)^{-1} \Gamma_e' R P_{xd} \qquad \text{Eq. 52}$$

$$= [\Gamma_e'(R P_{xx} R + \sigma^2 R)\Gamma_e]^{-1} \Gamma_e' R P_{xd}$$

Note that there are only $2^{m_L - m_H}$ nonzero entries in $P_{xd}$ which serves to pick out from the full MMSE combining matrix (that would recover all x) the $2^{m_L - m}$ rows that correspond to the effective high-rate user symbols, (in order to recover one of the low-rate user symbols embedded in all of the effective high-rate user symbols).

Preprocessing over the Low-Rate Interval

Figure 6A:
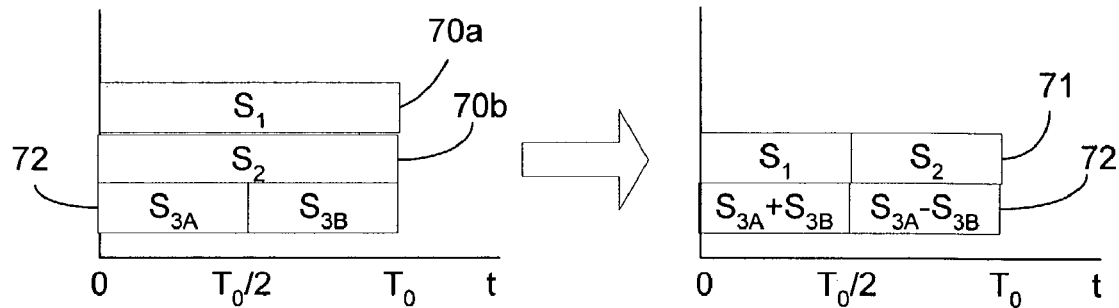
FIG. 6A shows a representation of another embodiment of a multirate system.

FIG. 6A shows a representation of another multirate system in which two low rate users 70a-70b are collapsed into an effective high rate user 71. The system also includes one actual high rate user 72. The low rate users 30a-70b each may have a spreading factor of 4, while the actual high rate user 72 has a spreading factor of 2. The symbol time of each of the low rate users 70a-70b is $T_o$, and the symbol time of the actual high rate user 72 is $T_o/2$.

Figure 6B:
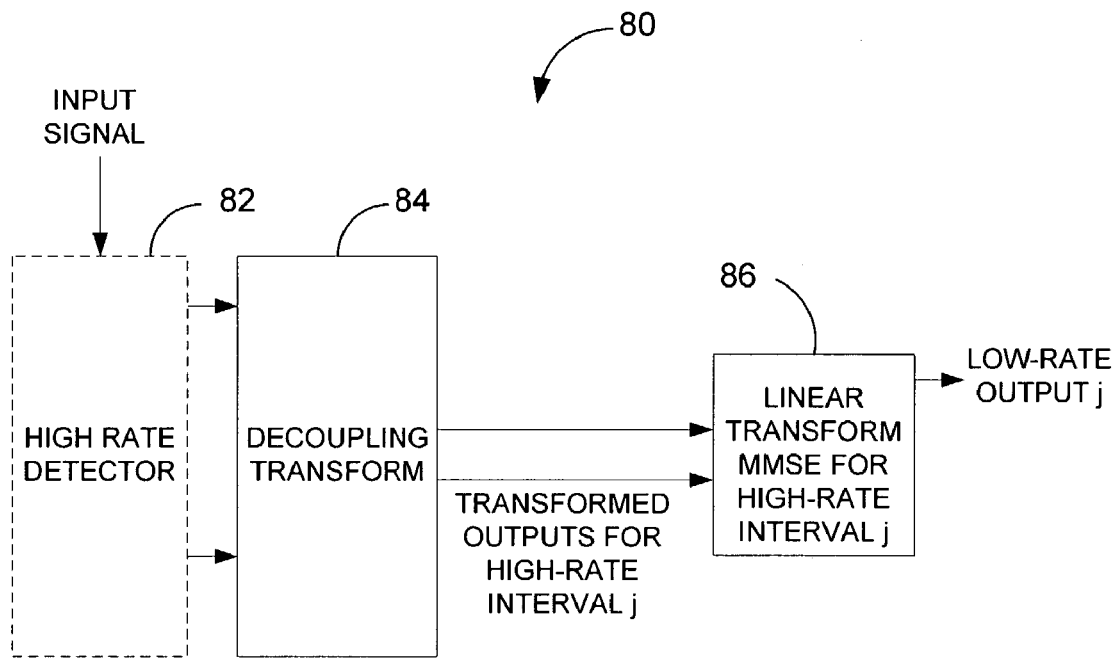
FIG. 6B shows a block diagram of another embodiment of a multiuser detector.

Referring to FIG. 6B, the detector 80 includes a high rate detector 82 similar in operation and function to high rate detectors 32 and 52. Similarly, the high rate detector 82 generates soft outputs for the actual high-rate users and the effective high-rate users. The detector 80 includes a linear detector 84 as the second stage and an MMSE detector 86 as the third stage. The linear detector 84 may post-multiply the soft outputs of the high rate detector 82 (over the whole low-rate symbol interval) to generate transformed effective high-rate user soft outputs and transformed actual high-rate user soft outputs. The multiple low-rate users appear as multiple decoupled high-rate symbols while still being coupled to the actual high rate users. The MMSE detector 86 may apply a linear transformation to the soft outputs of the second stage linear detector over one high-rate interval to decouple a low rate user (i.e. transformed effective high-rate symbol) from the actual high rate users. For chip-level processing (described later), the detector 80 will not include the high-rate detector 82. Instead, the preprocessing decoupling transformation 84 is applied directly to the input received signal.

The (symbol-level) preprocessing method just described transforms the matched-filter outputs over the $2^{m_L - m_H}$ high-rate intervals to a new set of outputs for $K_L$ transformed intervals. The transformed outputs decouple the low-rate users, which overlap and extend over the $2^{m_L - m_H}$ high-rate intervals, into separate distinct $K_L$ pseudo-high-rate intervals; in the process, the high-rate users are transformed into low-rate users, which can be modeled as "effective" high-rate users, as previously described, (FIG. 6A). This initial transformation enables us to apply a single high-rate linear transform over a single high-rate interval, thus, significantly reducing complexity, (FIG. 6B). Recall that Method 1 and Method 2 of the previous sub-sections, entailed computing an MMSE solution for each high-rate interval, with post-processing combining of these multiple MMSE high-rate outputs to get an estimate for a low-rate symbol. Here, the preprocessing enables the detection to consist of a single high-rate MMSE transform, with no post-processing combining necessary.

This embodiment describes MMSE detection, as we have done elsewhere in the report. Other linear transformations can be applied as well to the post-transformed pseudo-high-rate intervals to recover the low-rate users.

Note that the approach described here requires that the code words for each user repeat (to within a sign change) every high-rate interval, a property that is satisfied by the spreading codes introduced earlier. This will generally not be the case in commercial systems since the transmissions from different cells are mixed with unique very long codes spanning many symbols. (One cell can be processed by first stripping off the long code.) As such, the other-cell user will not be discussed in this section. For systems where the other-cell users' code-words do repeat every high-rate interval (to within a sign change), then they could easily be included in the processing. Note that even if only intra-cell signals are processed, this low complexity method will provide better performance than a standard MMSE chip equalizer.

We can arrange the conventional detector outputs for the $2^{m_L-m_H}$ high-rate intervals as follows, (assuming a single symbol window, i.e., no edge effects):

$$Y = \lfloor y[1] \, y[2] \cdots y[2^{m_L-m_H}] \rfloor \quad \text{Eq. 53}$$

$$= R[x[1] \, x[2] \cdots x[2^{m_L-m_H}]] + [z[1] \, z[2] \cdots z[2^{m_L-m_H}]]$$

$$= R \begin{bmatrix} \sum_i^{K_L} A_i^{(L)} d_i^{(L)} H'_{K_L,i,1} & \sum_i^{K_L} A_i^{(L)} d_i^{(L)} H'_{K_L,i,2} & \cdots & \sum_i^{K_L} A_i^{(L)} d_i^{(L)} H'_{K_L,i,2^{m_L-m_H}} \\ A_1^{(H)}[1]d_1^{(H)}[1] & A_1^{(H)}[2]d_1^{(H)}[2] & \cdots & A_1^{(H)}[2^{m_L-m_H}]d_1^{(H)}[2^{m_L-m_H}] \\ A_2^{(H)}[1]d_2^{(H)}[1] & A_2^{(H)}[2]d_2^{(H)}[2] & \cdots & A_2^{(H)}[2^{m_L-m_H}]d_2^{(H)}[2^{m_L-m_H}] \\ \vdots & \vdots & \ddots & \vdots \\ A_{K_H}^{(H)}[1]d_{K_H}^{(H)}[1] & A_{K_H}^{(H)}[2]d_{K_H}^{(H)}[2] & \cdots & A_{K_H}^{(H)}[2^{m_L-m_H}]d_{K_H}^{(H)}[2^{m_L-m_H}] \end{bmatrix} + Z$$

$$= RX + Z$$

Note that R (square matrix of order K, with $K=K_H+1$) does not depend on the interval, because of the assumption, (stated above), that all the code words repeat (to within a sign change) every high-rate interval. The first row of the matrix X can be expressed as follows:

$$[A_1^{(L)} d_1^{(L)} \, A_2^{(L)} d_2^{(L)} \cdots A_{K_L}^{(L)} d_{K_L}^{(L)}] H'_{K_L} \quad \text{Eq. 54}$$

where $H_{K_L}$, (defined earlier), is a $2^{m_L-m_H} \times K_L$ matrix with $K_L$ columns of the Walsh-Hadamard matrix of order $2^{m_L-m_H}$. These $2^{m_L-m_H}$ high-rate interval outputs can be transformed into $K_L$ transformed interval outputs as follows:

$$Y_T = Y H_{K_L} \quad \text{Eq. 55}$$

$$= [y_T[1] \, y_T[2] \cdots y_T[K_L]]$$

$$= R[x_T[1] \, x_T[2] \cdots x_T[K_L]] + [z_T[1] \, z_T[2] \cdots z_T[K_L]]$$

$$= R \begin{bmatrix} 2^{m_L-m_H} A_1^{(L)} d_1^{(L)} & 2^{m_L-m_H} A_2^{(L)} d_2^{(L)} & \cdots & 2^{m_L-m_H} A_{K_L}^{(L)} d_{K_L}^{(L)} \\ \sum_i^{2^{m_L-m_H}} A_1^{(H)}[i]d_1^{(H)}[i]H_{K_L,i,1} & \sum_i^{2^{m_L-m_H}} A_1^{(H)}[i]d_1^{(H)}[i]H_{K_L,i,2} & \cdots & \sum_i^{2^{m_L-m_H}} A_1^{(H)}[i]d_1^{(H)}[i]H_{K_L,i,K_L} \\ \sum_i^{2^{m_L-m_H}} A_2^{(H)}[i]d_2^{(H)}[i]H_{K_L,i,1} & \sum_i^{2^{m_L-m_H}} A_2^{(H)}[i]d_2^{(H)}[i]H_{K_L,i,2} & \cdots & \sum_i^{2^{m_L-m_H}} A_2^{(H)}[i]d_2^{(H)}[i]H_{K_L,i,K_L} \\ \vdots & \vdots & \ddots & \vdots \\ \sum_i^{2^{m_L-m_H}} A_{K_H}^{(H)}[i]d_{K_H}^{(H)}[i]H_{K_L,i,1} & \sum_i^{2^{m_L-m_H}} A_{K_H}^{(H)}[i]d_{K_H}^{(H)}[i]H_{K_L,i,2} & \cdots & \sum_i^{2^{m_L-m_H}} A_{K_H}^{(H)}[i]d_{K_H}^{(H)}[i]H_{K_L,i,K_L} \end{bmatrix} + Z_T$$

$$= RX_T + Z_T$$

Now solving directly for the jth low-rate user, can be done as follows. The output for the jth transformed interval is $$y_T[j] = R x_T[j] + z_T[j] \quad \text{Eq. 56}$$

As can be seen from Eq. 55, the jth low-rate user is already decoupled in this transformed interval. We can solve for the $x_T[j]$ by minimizing the MSE of $$E(|x_T[j] - L[j] y_T[j]|^2) \quad \text{Eq. 57}$$

Note that we could get the exact same result for the low-rate users by using $d_j^{(L)}$ instead of $x_T[j]$ in the cost function above, since $x_T[j]_1$ (first element of $x_T[j]$) depends only on $d_j^{(L)}$ and is decoupled from the other users.

The solution to this is $$L[j]' = (E[y_T[j] y_T[j]'])^{-1} E(y_T[j] x_T[j]') \quad \text{Eq. 58}$$

where $$E[y_T[j] y_T[j]'] = R \overline{x_T[j] x_T'[j]} R + \overline{z_T[j] z_T'[j]} = \quad \text{Eq. 59}$$

$$2^{m_L - m_H} R P_T[j] R + 2^{m_L - m_H} \sigma^2 R$$

$$E[y_T[j] x_T[j]'] = R \overline{x_T[j] x_T'[j]} = 2^{m_L - m_H} R P_T[j] \quad \text{Eq. 60}$$

and $P_T[j]$ can be expressed as:

$$P_T[j] = E(x_T[j] x_T[j]') / 2^{m_L - m_H} \quad \text{Eq. 61}$$

$$= \frac{1}{2^{m_L - m_H}} \text{diag}\left( (2^{m_L - m_H})^2 |A_j^{(L)}|^2 \sum_i^{2^{m_L - m_H}} |A_1^{(H)}[i]|^2 \right.$$

$$\left. \sum_i^{2^{m_L - m_H}} |A_2^{(H)}[i]|^2 \cdots \sum_i^{2^{m_L - m_H}} |A_{K_H}^{(H)}[i]|^2 \right)$$

and if the high-rate symbol powers remain constant throughout the low-rate symbol interval, (i.e., $A_k^{(H)}[i] = A_k^{(H)}$, for all i), then we can write $$P_T[j] = E(x_T[j] x_T[j]') / 2^{m_L - m_H} \quad \text{Eq. 62}$$

$$= \text{diag}\left( 2^{m_L - m_H} |A_j^{(L)}|^2 |A_1^{(H)}|^2 |A_2^{(H)}|^2 \cdots |A_{K_H}^{(H)}|^2 \right)$$

If a high-rate symbol window greater than one is used, then the solution remains the same, except that $P_T[j]$ will no longer be diagonal, similar to the development in the High Rate User Sections for detecting high-rate users. For example, if we consider a 3 symbol window, then:

$$x_T[j] = [x_T[j](-1)^T \; x_T[j](0)^T \; x_T[j](+1)^T]^T \quad \text{Eq. 63}$$

$$y_T[j] = [y_T[j](-1)^T \; y_T[j](0)^T \; y_T[j](+1)^T]^T \quad \text{Eq. 64}$$

$$x_T[1](0)_1 = x_T[2](-1)_1; \; x_T[2](0)_1 = x_T[1](+1)_1 = x_T[3](-1)_1, \text{etc.} \quad \text{Eq. 65}$$

$$y_T[1](0)_1 = y_T[2](-1)_1; \; y_T[2](0)_1 = y_T[1](+1)_1 = y_T[3](-1)_1, \text{etc.} \quad \text{Eq. 66}$$

and the diagonal elements of $P_T[j]$ will be:

$$\text{Diagonal Elements} = \begin{bmatrix} (2^{m_L - m_H})^2 |A_i^{(L)}[j](-1)|^2 \\ \sum_{i=1}^{2^{m_L - m_H}} |A_1^{(H)}[i](-1)|^2 \\ \vdots \\ \sum_{i=1}^{2^{m_L - m_H}} |A_{K_H}^{(H)}[i](-1)|^2 \\ (2^{m_L - m_H})^2 |A_i^{(L)}(0)|^2 \\ \sum_{i=1}^{2^{m_L - m_H}} |A_1^{(H)}[i](0)|^2 \\ \vdots \\ \sum_{i=1}^{2^{m_L - m_H}} |A_{K_H}^{(L)}[i](0)|^2 \\ (2^{m_L - m_H})^2 |A_i^{(L)}[j](+1)|^2 \\ \sum_{i=1}^{2^{m_L - m_H}} |A_1^{(H)}[i](+1)|^2 \\ \vdots \\ \sum_{i=1}^{2^{m_L - m_H}} |A_{K_H}^{(H)}[i](+1)|^2 \end{bmatrix} \quad \text{Eq. 67}$$

$$d_i^{(L)}[j](-1) = d_i^{(L)}(0),$$

$$A_i^{(L)}[j](-1) = A_i^{(L)}(0),$$

for $j = 2, 3, \ldots 2^{m_L - m_H}$ where $$d_i^{(L)}[j](+1) = d_i^{(L)}(0),$$

$$A_i^{(L)}[j](+1) = A_i^{(L)}(0),$$

for $j = 1, 2, 3, \ldots 2^{m_L - m_H} - 1$ where $A_k^{(H)}[i](-1)$ is the amplitude of the kth user for the ith high-rate interval of the previous low-rate symbol; the off-diagonal elements are all zero except for the following:

for $j = 2, 3, \ldots, 2^{m_L - m_H}$: Eq. 68

$$\overline{x_T[j](-1) x_T[j](0)^*} = \overline{x_T[j](0) x_T[j](-1)^*}$$

$$= \text{diag}\left( 0 \; \sum_i^{K_L} |A_1^{(H)}[i]|^2 H_{i,j} H_{i,j-1} \cdots \sum_i^{K_L} |A_{K_H}^{(H)}[i]|^2 H_{i,j} H_{i,j-1} \right)$$

-continued for $j = 1, 2, 3, \ldots, 2^{m_L - m_H} - 1$:

$$\overline{x_T[j](0)x_T[j](+1)^*} = \overline{x_T[j](+1)x_T[j](0)^*}$$

$$= diag\left(0 \sum_{i}^{K_L} |A_1^{(H)}[i]|^2 H_{i,j}H_{i,j+1} \cdots \sum_{i}^{K_L} |A_{K_H}^{(H)}[i]|^2 H_{i,j}H_{i,j+1}\right)$$

for $j = 2, 3, \ldots, 2^{m_L - m_H} - 1$:

$$\overline{x_T[j](-1)x_T[j](+1)^*} = \overline{x_T[j](+1)x_T[j](-1)^*}$$

$$= diag\left(0 \sum_{i}^{K_L} |A_1^{(H)}[i]|^2 H_{i,j-1}H_{i,j+1} \cdots \sum_{i}^{K_L} |A_{K_H}^{(H)}[i]|^2 H_{i,j-1}H_{i,j+1}\right)$$

Note that each group of high-rate intervals making up a specific low-rate interval is transformed separately. Thus, first transform 3 low-rate symbols worth of high-rate outputs are transformed, one low-rate interval at a time, before implementing the high-rate MMSE approach described here to detect a low-rate user.

Plugging in Eq. 59 and Eq. 60 into Eq. 58, we have the solution $$L[j]' = (R + \sigma^2 P_T[j]^{-1})^{-1} \quad \text{Eq. 69}$$

Note that alternative linear transformations are also possible after the initial transformation decouples the low-rate users into separate high-rate intervals. For example, a "decorrelator" approach can be used to decouple the transformed data by forming $$R^{-1}y_T[j] = x_T[j] + R^{-1}z_T[j] \quad \text{Eq. 70}$$

An advantage of this approach is that it doesn't depend on the signal-to-noise levels of the users. A disadvantage, however, is that performance will not be as good as the MMSE approach described in this section, since applying the linear transformation $R^{-1}$ causes degrading noise enhancement to $Z_T$.

Figure 7:
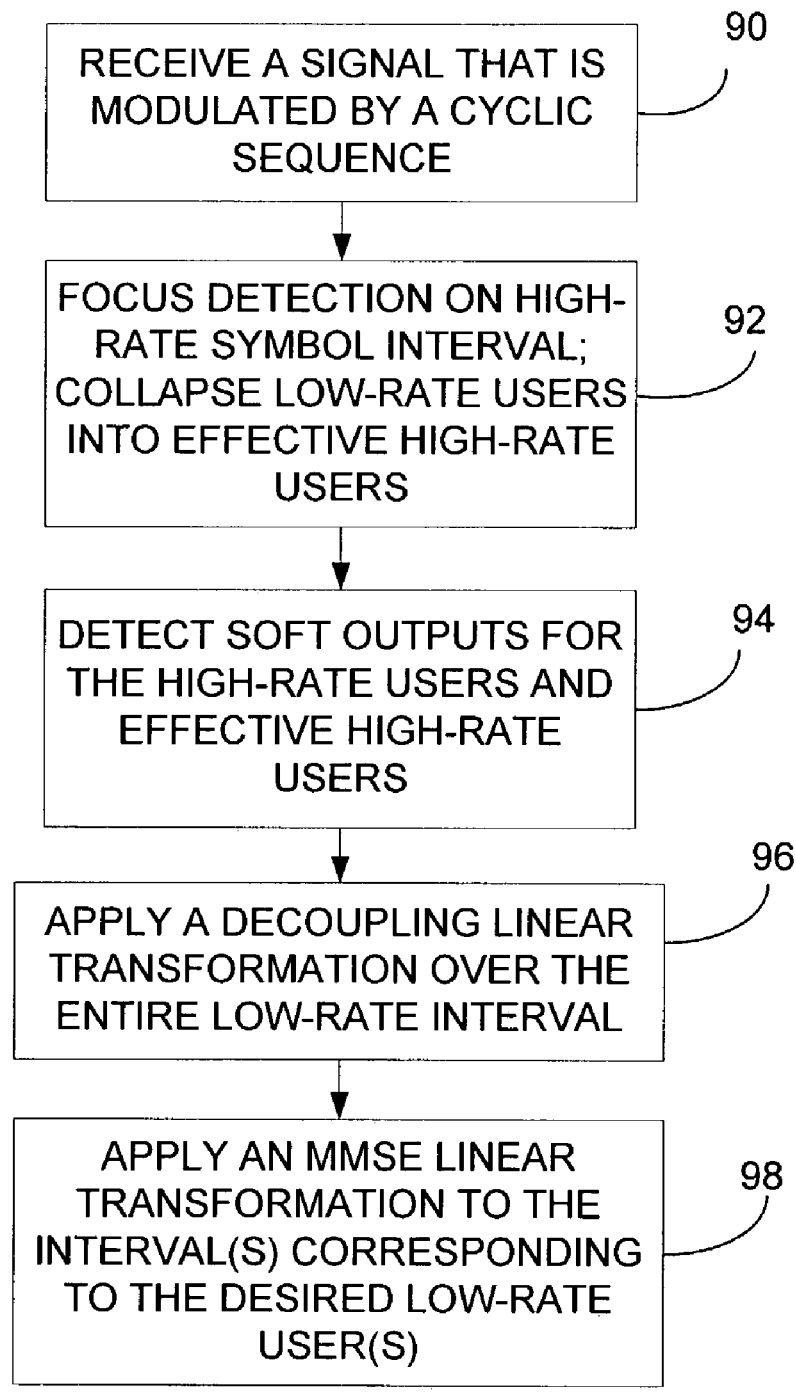
FIG. 7 shows a flow chart of the operation of an embodiment of a multiuser detector

FIG. 7 shows a flow chart of the operation of the detector 80. Blocks 90-94 of the operation are similar to the operation of the detector 50 described in blocks 60-64 of FIG. 5. Continuing on to block 96, a decoupling linear transformation is applied to the high rate soft outputs to generate transformed effective high-rate user soft outputs and transformed actual high-rate user soft outputs that remain coupled. Finishing at block 98, an MMSE linear transformation is applied to the transformed outputs to decouple the low-rate users from the actual high rate users.

Low Rate User Chip Level Processing

In this section, several methods of recovering the low-rate users are used by applying linear transformations directly to the received signal samples over smaller ("higher-rate") subintervals. The first two methods are based on the concept that instead of one MMSE processing window over the entire low-rate symbol interval, the MMSE processing can be divided into several separate smaller windows, to obtain an MMSE estimate for the low-rate user for each processing sub-interval, and combine these estimates for the low-rate user in some way. In other words, the $2^{m_L - m_H}$ outputs from the high-rate MMSE processing for the low-rate users are combined in some way to get an estimate of the low-rate user. The outputs from the high-rate MMSE processing for the low-rate users follow from the minimization of the cost function $$E|d_i^{(L)} - v[j]'r[j]|^2$$

Thus, dropping the reference to the jth subinterval for convenience, this can be written as:

$$v = E[rr']^{-1}E\left[rd_i^{(L)^*}\right]$$

$$= (GPG' + \sigma^2 I)^{-1}Gp$$

where $$E[rr'] = G\overline{xx'}G' + \overline{nn'} = GPG' + \sigma^2 I$$

$$E\left[rd_i^{(L)^*}\right] = G\overline{xd_i^{(L)^*}} = Gp$$

and where P was defined earlier (High Rate User Symbol Level Processing section) and where p is a vector such that the only non-zero entries in p correspond to the effective high-rate users in x, and the value of these non-zero entries are equal to $A_i^{(L)}H'_{K_L,i,j}$, (see the beginning of the Low Rate User Symbol Level Processing).

Method 1: Low Rate User Chip Level Processing, Decoupling Combining

In each of the high-rate MMSE outputs (i.e., for each sub-interval) for the low-rate user derived above, part of the low-rate symbol is recovered, i.e., we partly recover an effective high-rate user that represents some combination of the underlying collapsed low-rate users. As described below, these outputs can be combined in some way as to decouple and detect the low-rate users. Using this approach allows us to apply MMSE solutions in smaller subintervals, which reduces complexity, while still recovering the low-rate users.

We denote the output of the high-rate linear MMSE transformation for the effective high-rate user in the jth high-rate subinterval as:

$$y_e[j] = v_e[j]'r[j] \quad \text{Eq. 71}$$

We can further define a vector of effective high-rate user symbol outputs for all intervals as:

$$y_e = [y_e[1] \ldots y_e[2^{m_L - m_H}]]^T \quad \text{Eq. 72}$$

Assuming that we are taking neighboring symbols into account by using a window of 3 full high-rate symbols for each high-rate interval MMSE solution. This choice of processing window is not meant to limit the development in this section at all, and it can be easily and directly extended to any window size, including windows that only take into account less than one full neighbor symbol on each side. Accordingly, defining r as the vector of received samples over the low-rate symbol interval, ($2^{m_L}$ chips), and extending this on either side of the low-rate interval to accommodate multipath delay spread and the modeling of edge effects. Thus, if a window of 3-high rate symbols is used in the high-rate MMSE detection, we would need an extra high-rate interval of received samples on either side, plus some extra samples to accommodate delay spread. Based on this, we can express $$Y_e = V_e' r \quad \text{Eq. 73}$$

where r extends over $2^{m_L} + 2(2^{m_H} + ds)$ chips, where ds is the number of extra chips needed for the delay spread on each side, and where $$V_e' = \begin{bmatrix} [v_e[1]^T] & & & \\ & [v_e[2]^T] & & 0 \\ & & \ddots & \\ & 0 & & [v_e[2^{m_L-m_H}-1]^T] \\ & & & & [v_e[2^{m_L-m_H}]^T] \end{bmatrix} \quad \text{Eq. 74}$$

where each vector $v_e[j]^T$ is of length $3*2^{m_H}+2ds$. The vectors $v_e[j]^T$ are shifted to the left by $2^{m_H}$ in each successive row; thus, the matrix $V_e'$ has dimensions $2^{m_L-m_H} \times (2^{m_L}+2(2^{m_H}+ds))$.

Note that if this does not consider edge effects, and instead uses a single high-rate symbol window for each high-rate interval MMSE detection, then r would extend over $2^{m_L}+2ds$, $v_e[j]^T$ would be of length $2^{m_H}+2ds$, and $V_e'$ would have dimension $2^{m_L-m_H} \times 2^{m_L}+2ds$ Now the effective high-rate symbol soft MMSE outputs can be expressed as follows:

$$y_e = V_e' r \quad \text{Eq. 75}$$
$$= V_e' G x + V_e' n$$
$$= V_e' (G_e x_e + G_{\sim e} x_{\sim e}) + z_e$$
$$= V_e' G_e x_e + V_e' G_{\sim e} x_{\sim e} + z_e$$
$$= Q_e x_e + V_e' G_{\sim e} x_{\sim e} + z_e$$

where x is defined as in Eq. 37; $x_e$ is a vector (length $2^{m_L-m_H}$) which contains the data of the effective high-rate users only (for all $2^{m_L-m_H}$ high-rate intervals within the low-rate interval being processed); $x_{\sim e}$ contains the data of the remaining users; $G_e$ is the code matrix, (with dimensions $(2^{m_L}+2(2^{m_H}+ds)) \times 2^{m_L-m_H}$), with each column containing the effective high-rate user code for a different high-rate interval, (shifted horizontally to represent the relative timing of the interval); $G_{\sim e}$ is the code matrix for the remaining users; the middle term, $V_e' G_{\sim e} x_{\sim e}$, represents the residual interference after the MMSE linear transformation is applied; $z_e$ is the post-MMSE processed thermal noise; $Q_e$ is implicitly defined in the above equation as $$Q_e = V_e' G_e \quad \text{Eq. 76}$$

and is a square matrix of order $2^{m_L-m_H}$. Note that $Q_e$ will be diagonal in the case when only a single high-rate symbol interval is considered for the high-rate MMSE detection, (and where there is no multipath delay spread, i.e., ds=0). As we saw in Eq. 48, we can express the effective high-rate user outputs as:

$$x_e = H_{K_L} A^{(L)} d^{(L)} \quad \text{Eq. 77}$$

Therefore, in order to decouple and recover the low-rate users, form $$y_L = H'_{K_L} Q_e^{-1} V_e' r \quad \text{Eq. 78}$$
$$= H'_{K_L} Q_e^{-1} y_e$$

Low Rate User Chip Level Processing, General Decoupling Combining

Based on the above discussion, a general form of decoupling combining (to recover the low-rate user symbol from the effective high-rate user symbol estimates) can be defined where the initial high-rate processing is done by some general linear transformation, namely:

$$y_L = H'_{K_L} (LG_e)^{-1} L r \quad \text{Eq. 78a}$$
$$= H'_{K_L} (LG_e)^{-1} y_e$$

where L is some linear transform of dimensions $2^{m_L-m_H} \times (2^{m_L}+2(2^{m_H}+ds))$, (for the 3-symbol window case), $y_e = Lr$ provides estimates of the effective high-rate user symbols, and $G_e$ (dimensions $(2^{m_L}+2(2^{m_H}+ds)) \times 2^{m_L-m_H}$) was defined implicitly in Eq. 75:

$$r = Gx + n \quad \text{Eq. 78b}$$
$$= G_e x_e + G_{\sim e} x_{\sim e} + n$$

The application of $(LG_e)^{-1}L$ to r is decouples the effective high-rate symbols, $x_e$, and the subsequent application of $H'_{K_L}$ will combine the effective high-rate data values in such a way as to recover the low-rate data. Considering several special cases:

1. 
$$L = G_e'.$$

This is equivalent to applying the generalized inverse of $G_e$ to r to decouple the effective high-rate symbols $x_e$.

2. $L = V_e'$, as discussed above (e.g., Eq. 78), where the rows of $V_e'$ contain the high-rate MMSE solutions for the effective high-rate user outputs, (Eq. 75).

3. L can be chosen to minimize $$E|x_e - (LG_e)^{-1}Lr|^2$$

Method 2: Low Rate User Chip Level Processing, MMSE Combining

The method described in the previous section applied a weight vector to $y_e$, (containing outputs for the effective high-rate user for each interval, see Eq. 78), to decouple or "decorrelate" the low rate users. In this section, the techniques attempt to derive a weight vector that when applied to $y_e$ would minimize the following MSE:

$$E(|d_k^{(L)} - w'y_e|^2) \quad \text{Eq. 79}$$

to solve for the kth low-rate user's symbol. The solution to this is $$w = (\overline{y_e y_e'})^{-1}(\overline{y_e d_k^{(L)*}}) \quad \text{Eq. 80}$$

where, based on Eq. 75, $$\overline{y_e y_e'} = V'\overline{rr'}V_e = V_e'(G\overline{xx'}G' + \sigma^2 I)V_e \quad \text{Eq. 81}$$
$$= V_e'(GP_{xx}G' + \sigma^2 I)V_e$$

$$\overline{y_e d_k^{(L)*}} = V_e'\overline{rd_k^{(L)*}} = V_e'G\overline{xd_k^{(L)*}} \quad \text{Eq. 82}$$
$$= V_e'GP_{xd}$$

where $\overline{rr'}$ is expressed similarly to what was done in Eq. 24; The matrices $P_{xx}$ and $P_{xd}$ have already been defined in the section on Low-Rate User Symbol-level Processing with MMSE Combining. Plugging in Eq. 81 and Eq. 82 into Eq. 81, yields $$w = [V_e'(GP_{xx}G' + \sigma^2 I)V_e]^{-1} V_e'GP_{xd} \quad \text{Eq. 83}$$

Method 3: Preprocessing Over the Low-Rate Interval

The approach described here is very similar to the symbol-level preprocessing approach previously described, except that here we operate directly on the received signal, (i.e., there would be no front-end high-rate detector 82 in FIG. 6B). Here we transform the received signal vectors for the $2^{m_L-m_H}$ high-rate intervals to a new set of received signal vectors for $K_L$ transformed intervals. The transformation serves to decouple the low-rate users into $K_L$ separate distinct pseudo-high-rate intervals, (FIG. 6A). This initial transformation enables applying a single high-rate linear transform over a single high-rate interval, thus, significantly reducing complexity. Recall that Method 1 and Method 2 of the previous 2 sub-sections, entailed computing an MMSE solution for each high-rate interval, with post-processing combining of these multiple MMSE high-rate outputs to get an estimate for a low-rate symbol. Here, the preprocessing enables the detection to consist of a single high-rate MMSE transform, with no post-processing combining necessary.

The approach described here requires that the code words for each user repeat (to within a sign change) every high-rate interval, a property that is satisfied by the spreading codes introduced earlier. This will generally not be the case in commercial systems for the other-cell users since the transmissions from different cells are mixed with unique very long codes spanning many symbols. (One cell can be processed by first stripping off the long code.) As such, we will not include the other-cell user in this section. For systems where the other-cell users' code-words did repeat every high-rate interval (to within a sign change), then they could easily be included in the processing. Note that even if only intra-cell signals are processed, this low complexity method will provide better performance than a standard MMSE chip equalizer.

The received signal samples for the $2^{m_L-m_H}$ high-rate intervals can be rearranged as follows, (assuming a single symbol window, i.e., no edge effects):

$$\mathfrak{R} = \lfloor r[1] \, r[2] \, \cdots r[2^{m_L-m_H}] \rfloor \quad \text{Eq. 84}$$

$$= G[x[1]\,x[2]\cdots x[2^{m_L-m_H}]] + n[1]\,n[2]\cdots n[2^{m_L-m_H}]]$$

$$= G \begin{bmatrix} \sum_i^{K_L} A_i^{(L)} d_i^{(L)} H'_{K_L,i,1} & \sum_i^{K_L} A_i^{(L)} d_i^{(L)} H'_{K_L,i,2} & \cdots & \sum_i^{K_L} A_i^{(L)} d_i^{(L)} H'_{K_L,i,2^{m_L-m_H}} \\ A_1^{(H)}[1]d_1^{(H)}[1] & A_1^{(H)}[2]d_1^{(H)}[2] & \cdots & A_1^{(H)}[2^{m_L-m_H}]d_1^{(H)}[2^{m_L-m_H}] \\ A_2^{(H)}[1]d_2^{(H)}[1] & A_2^{(H)}[2]d_2^{(H)}[2] & \cdots & A_2^{(H)}[2^{m_L-m_H}]d_2^{(H)}[2^{m_L-m_H}] \\ \vdots & \vdots & \ddots & \vdots \\ A_{K_H}^{(H)}[1]d_{K_H}^{(H)}[1] & A_{K_H}^{(H)}[2]d_{K_H}^{(H)}[2] & \cdots & A_{K_H}^{(H)}[2^{m_L-m_H}]d_{K_H}^{(H)}[2^{m_L-m_H}] \end{bmatrix} + N$$

$$= GX + N$$

where $\mathfrak{R}$ is of dimensions $(2^{m_H}+2ds) \times 2^{m_L-m_H}$ and the code matrix G is of dimensions $(2^{m_H}+22ds) \times K$, (with $K=K_H+1$). Note that G does not depend on the interval number, j, because of the assumption, (stated above), that all the code words repeat (to within a sign change) every high-rate interval. Note also that the vectors r[j] and r[j±1] will overlap if there is some delay spread, (or if we are using a processing window of greater than 1 symbol, as indicated later in this section). The first row of the matrix X can be expressed as follows:

$$[A_1^{(L)}d_1^{(L)} A_2^{(L)}d_2^{(L)} \ldots A_{K_L}^{(L)}d_{K_L}^{(L)}]H'_{K_L} \quad \text{Eq. 85}$$

where $H_{K_L}$, (defined earlier), is a $2^{m_L-m_H} \times K_L$ matrix with $K_L$ columns of the Walsh-Hadamard matrix of order $2^{m_L-m_H}$. We can transform these $2^{m_L-m_H}$ high-rate interval received signal vectors into $K_L$ transformed received signal vectors as follows:

$$\mathfrak{R}_T = \mathfrak{R}H_{K_L} \qquad \text{Eq. 86}$$

$$= [r_T[1]\ r_T[2]\ \cdots\ r_T[K_L]]$$

$$= G[x_T[1]\ x_T[2]\ \cdots\ x_T[K_L]] + [n_T[1]\ n_T[2]\ \cdots\ n_T[K_L]]$$

$$= G \begin{bmatrix} 2^{m_L-m_H} A_1^{(L)} d_1^{(L)} & 2^{m_L-m_H} A_2^{(L)} d_2^{(L)} & \cdots & 2^{m_L-m_H} A_{K_L}^{(L)} d_{K_L}^{(L)} \\ \sum_i^{2^{m_L-m_H}} A_1^{(H)}[i]d_1^{(H)}[i]H_{K_L,i,1} & \sum_i^{2^{m_L-m_H}} A_1^{(H)}[i]d_1^{(H)}[i]H_{K_L,i,2} & \cdots & \sum_i^{2^{m_L-m_H}} A_1^{(H)}[i]d_1^{(H)}[i]H_{K_L,i,K_L} \\ \sum_i^{2^{m_L-m_H}} A_2^{(H)}[i]d_2^{(H)}[i]H_{K_L,i,1} & \sum_i^{2^{m_L-m_H}} A_2^{(H)}[i]d_2^{(H)}[i]H_{K_L,i,2} & \cdots & \sum_i^{2^{m_L-m_H}} A_2^{(H)}[i]d_2^{(H)}[i]H_{K_L,i,K_L} \\ \vdots & \vdots & \ddots & \vdots \\ \sum_i^{2^{m_L-m_H}} A_{K_H}^{(H)}[i]d_{K_H}^{(H)}[i]H_{K_L,i,1} & \sum_i^{2^{m_L-m_H}} A_{K_H}^{(H)}[i]d_{K_H}^{(h)}[i]H_{K_L,i,2} & \cdots & \sum_i^{2^{m_L-m_H}} A_{K_H}^{(H)}[i]d_{K_H}^{(H)}[i]H_{K_L,i,K_L} \end{bmatrix} + N_T$$

$$= GX_T + N_T$$

where the matrix of transformed received chips, $\mathfrak{R}_T$, is of dimensions $(2^{m_H}+2ds) \times K_L$.

As previously mentioned, (when this technique was discussed for symbol-level processing), alternative linear transformations are also possible after the initial transformation decouples the low-rate users into separate high-rate intervals. An MMSE approach is described below.

Solve directly for the jth low-rate user as follows. The received signal for the jth transformed interval is $$r_T[j] = Gx_T[j] + n_T[j] \qquad \text{Eq. 87}$$

As can be seen from Eq. 86, the jth low-rate is already decoupled in this transformed interval. We can solve for the low rate user symbol $d_j^{(L)}$ by minimizing the MSE of $$E\left(\left|d_j^{(L)} - v[j]' r_T[j]\right|^2\right) \qquad \text{Eq. 88}$$

The solution to this is $$v[j] = (E[r_T[j]r_T[j]'])^{-1} E\left[r_T[j]d_j^{(L)*}\right] \qquad \text{Eq. 89}$$

where $$E[r_T[j]r_T[j]'] = G\overline{x_T[j]x_T'[j]}G' + \overline{n_T[j]n_T'[j]} = \qquad \text{Eq. 90}$$

$$2^{m_L-m_H} G P_{xx,T}[j] G' + 2^{m_L-m_H} \sigma^2 I$$

$$E\left[r_T[j]d_j^{(L)*}\right] = G\overline{x[j]d_j^{(L)*}} = 2^{m_L-m_H} G P_{xd,T}[j] \qquad \text{Eq. 91}$$

where $P_{xx,T}[j]$ is defined as $P_T[j]$ earlier; $P_{xd,T}$ is a vector of all zeros except for the nonzero entry corresponding to $$\overline{x[j]_1 d_j^{(L)*}} = A_j^{(L)},$$

(here, the first entry in $P_{xd,T}$).

If we utilize a high-rate symbol window greater than one is used, then the solution is similar. For example, using a 3 symbol window for processing, then $$x_T[j] = [x_T[j](-1)^T\ x_T[j](0)^T\ x_T[j](+1)^T]^T \qquad \text{Eq. 92}$$

$$r_T[j] = [r_T[j](-1)^T\ r_T[j](0)^T\ r_T[j](+1)^T]^T \qquad \text{Eq. 93}$$

where as before, [j](+1) and [j](−1) refer to the interval succeeding and the interval preceding the jth interval, respectively; thus:

$$x_T[1](0)_1 = x_T[2](-1)_1;\ x_T[2](0)_1 = x_T[1](+1)_1 = x_T[3](-1)_1,\ \text{etc.} \qquad \text{Eq. 94}$$

$$r_T[1](0)_1 = r_T[2](-1)_1;\ r_T[2](0)_1 = r_T[1](+1)_1 = r_T[3](-1)_1,\text{etc.} \qquad \text{Eq. 95}$$

For this case, the matrix $P_{xx,T}[j]$ is defined earlier. In addition, the vector $P_{xd,T}$ is a vector of all zeros except for three non-zero entries corresponding to $$\overline{x[j]_1(0)d_j^{(L)*}} = \overline{x_T[j]_1(\pm 1)d_j^{(L)*}} = A_j^{(L)} \qquad \text{Eq. 96}$$

except at the edges where $$\overline{x_T[1]_1(-1)d_j^{(L)*}} = \overline{x_T[2^{m_L-m_H}]_1(+1)d_j^{(L)*}} = \text{vector of all zeros} \qquad \text{Eq. 97}$$

Note that the received signal chips are transformed one low-rate interval separately at a time. Thus, when using a processing window larger than one symbol (i.e., for taking edge effects into account), one needs to first transform 3 low-rate symbols worth of received samples, (transformed one low-rate interval at a time), before implementing the high-rate MMSE approach described here to detect a low-rate user. In other words, in order to obtain $r_T[1](-1)^T$ and $r_T[2^{m_L-m_H}](+1)^T$, one needs to first transform the entire previous and successive low-rate intervals, respectively.

Plugging in Eq. 90 and Eq. 91 into Eq. 89, gives the solution $$v[j] = (GP_{xx,T}[j]G' + \sigma^2 I)^{-1} GP_{xd,T}[j] \qquad \text{Eq. 98}$$

Generalized Preprocessing Over the Low-rate Interval

The previous sub-section, we considered a specific type of preprocessing which decouples the low-rate users into separate high-rate intervals. However, this may not be the optimal preprocessing transformation. In particular, it does not take other-cell users into account at all. Therefore, below we formulate a more general approach to utilizing the concept of preprocessing that could also take other-cell users into account. Assume that instead of a Walsh-Hadamard transform, the preprocessing for user j involves some arbitrary column vector h, i.e., $$r_T[j] = \mathfrak{R}h_j \qquad \text{Eq. 99}$$

Grouping the received signal in $\Re$ and performing this transformation essentially converts the number of samples to be processed from $2^{m_L}+2ds$ to $2^{m_H}+2ds$, (i.e., a many-to-one transformation). The processing of this reduced sample space is suboptimal compared to the larger sample space. Nevertheless, we can attempt to optimize the processing given that the maximum number of samples to process is set to some reduced level, (e.g., because of complexity considerations). The general approach to accomplish this can be described as follows:

1. Arrange the received signal samples in columns of length equal to the maximum number of samples you wish to process in one shot.
2. Initialize preprocessing transformation $h_j$ (e.g., to Walsh Hadamard transform column vector corresponding to the desired low-rate user—user j—as in the previous section).
3. Transform the received signal matrix of Step 1 by post-multiplying by the vector $h_j$, thus, reducing the sample space. This transformation is meant to decouple in some way low-rate user j from the other low-rate users in the reduced sample space.
4. Compute the MMSE mapping, given $h_j$. This will yield an MMSE solution which is a function of $h_j$, i.e., $$\min E(|d_j^{(L)} - v[j]'\mathbf{R}h_j|^2) \Rightarrow v[j]_{MMSE}(h_j) \qquad \text{Eq. 100}$$

5. Take the derivative of the MMSE solution with respect to $h_j$ in order to find the optimum $h_j$ preprocessing transformation vector.

An alternative to computing the derivative in Step 5 is to utilize numerical optimization techniques to iterate to the optimal $h_j$ solution. Therefore, Step 5 would now read:

5. Compute an improved value for $h_j$, (e.g., adaptively)
6. Go to Step 3

A similar generalized preprocessing approach can be applied to the symbol level processing of the Preprocessing Over the Low-Rate Interval section.

The approach described here can be generalized further by (1) applying some arbitrary preprocessing to the received signal samples that reduces the sample space (i.e., without any specific restrictions on how to perform the preprocessing), (2) computing the MMSE solution as a function of this preprocessing transformation, and (3) finding the optimal preprocessing transformation (directly/analytically or numerically/adaptively/iteratively).

Figure 8:
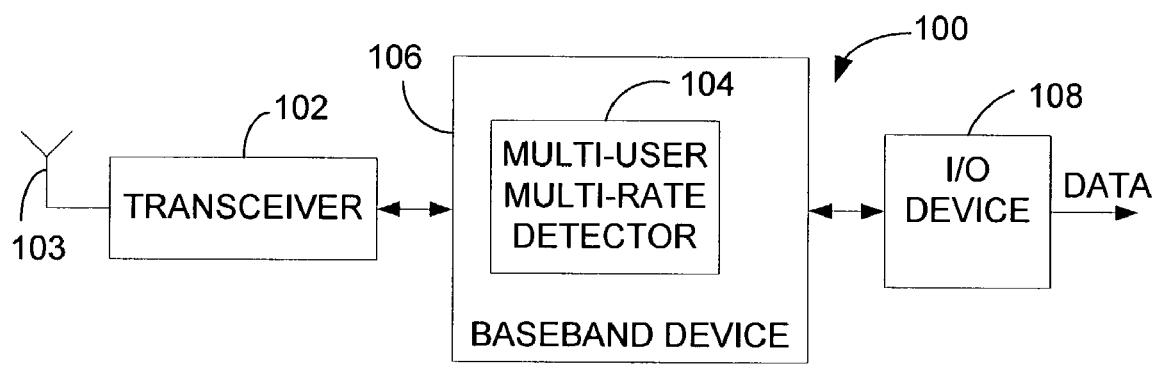
FIG. 8 shows a block diagram of a wireless device including a multiuser detector.

FIG. 8 shows a wireless device 100 for communicating information. The wireless device 100 may include a transceiver 102 coupled to an antenna 103 to communicate information with other wireless devices. A baseband device 106 may implement call processing, system control, and the man-machine interface. The baseband device 106 may include a multi-user multi-rate detector 104 to detect a conditioned input signal generated by the transceiver 102. The multi-user multi-rate detector 104 operates in accordance with one or more aspects of the detector described in this specification. The baseband device 106 may also include an audio codec to interface to one or more input/output (I/O) devices 106 such as keyboards, speakers, and microphones.

A number of embodiments of the invention have been described. Nevertheless, it will be understood that various modifications may be made without departing from the spirit and scope of the invention. Accordingly, other embodiments are within the scope of the following claims.

What is claimed is:

1. A system, comprising:
a high-rate linear Minimum Mean Square Error (MMSE) detector having a detection window, and producing outputs every high-rare detection interval that is above a low-rate symbol rate of low rate users, to generate at least one actual high-rate output based upon decoding an input signal that includes actual high-rate users and low-rate users, the at least one actual high-rate output corresponding to one of the actual high-rate users, the high-rate users having a higher symbol rate than the low-rate users.

2. The system of claim 1 wherein the input signal includes interfering higher-rate users having a symbol period shorter than high-rate detection intervals of the high-rate linear MMSE detector.

3. The system of claim 1 wherein the input signal is selected from a group consisting of a sampled signal and at least one output of a front-end high-rate detector applied to the sampled signal.

4. The system of claim 1 wherein a length of the detection window is not a function of a length of the high-rate detection interval.

5. The system of claim 1 wherein the detection window is greater than the high-rate detection interval and is a sliding window such that successive detection windows overlap, each detection of the successive detection windows producing a high-rate output for at least one symbol of the one of the actual high-rate users.

6. The system of claim 1 further comprising a space-time adaptive processor to generate the input signal from multi-antenna signal streams.

7. The system of claim 1 further including a cancellation module to apply interference cancellation processing to the input signal before the high-rate linear MMSE detector.

8. The system of claim 1 wherein the at least one actual high-rate output includes recovered symbols used to estimate and cancel interference.

9. The system of claim 1 wherein the at least one actual high-rate output further comprises recovered symbols that include forward error correction encoded symbols; and
further comprising a decoder to recover information bits associated with the forward error correction encoded symbols.

10. The system of claim 1 wherein the high-rate linear MMSE detector is based on modeling the low-rate users as effective high-rate users, the modeling based on a tree-structure property of spreading codes associated with the low-rate users.

11. The system of claim 10 wherein the input signal includes interfering higher-rate users having a symbol period shorter than the high-rate detection intervals of the high-rate linear MMSE detector.

12. The system of claim 10 wherein the input signal is selected from a group consisting of a sampled signal and at least one output of a front-end high-rate detector applied to the sampled signal.

13. The system of claim 10 wherein a length of the detection window is independent of a length of the high-rate detection interval.

14. The system of claim 10 wherein the detection window is greater than the high-rate detection interval and is sliding such that successive detection windows overlap, each detection of the successive detection windows producing a high-rate output for at least one symbol of the one of the actual high-rate users.

15. The system of claim 10 further comprising a space-time adaptive processor to generate the input signal from multi-antenna signal streams.

16. The system of claim 10 further including a cancellation module to apply interference cancellation processing to the input signal before the high-rate linear MMSE detector.

17. The system of claim 10 wherein the actual high-rate outputs are used to estimate and cancel interference in the input signal.

18. The system of claim 10 wherein at least one of the actual high-rate outputs further comprise recovered symbols that include forward error correction encoded symbols; and
further comprising a decoder to recover information bits associated with the forward error correction encoded symbols.

19. A system as in claim 1, further comprising a high rate detector to detect on a symbol rate that is above a low-rate symbol rate of low rate users of the multirate system and collapse two or more of the low rate users into an effective high rate user.

20. A system, comprising:
a general linear transformation detector having a detection window, and producing outputs at every high-rate detection interval, to generate high-rate outputs based upon decoding an input signal that includes low-rate users, within each high-rate interval at least one of the high-rate outputs corresponding to one of the low-rate users; and
a second stage including a combining technique to combine successive high-rate outputs of the stage corresponding to one of the low-rate users over a low-rate symbol period to generate a low-rate output corresponding to one of the low-rate users.

21. The system of claim 20 wherein the general linear transformation detector is a high-rate linear Minimum Mean Square Error (MMSE) detector.

22. The system of claim 21 wherein the second stage combining technique is selected from a group consisting of Decoupling Combining, General Decoupling Combining, and MMSE Combining.

23. The system of claim 20 wherein the second stage combining technique is General Decoupling Combining.

24. The system of claim 21 wherein the input signal includes interfering higher-rate users having a symbol period shorter than the high-rate detection intervals of the high-rate linear MMSE detector.

25. The system of claim 21 wherein the input signal is selected from a group consisting of a sampled signal and at least one output of a front-end high-rate detector applied to the sampled signal.

26. The system of claim 21 wherein a length of the detection window is not a function of a length of the high-rate detection interval.

27. The system of claim 21 wherein the detection window is greater than the high-rate detection interval and is sliding such that successive detection windows overlap, each detection of the successive detection windows producing a high-rate output.

28. The system of claim 21 further comprising a space-time adaptive processor to generate the input signal based upon multi-antenna signal streams.

29. The system of claim 21 further including a cancellation module to apply interference cancellation processing to the input signal before the high-rate linear MMSE detector.

30. The system of claim 21 wherein the low-rate output includes recovered symbols used to estimate and cancel interference.

31. The system of claim 21 wherein the low-rate output further comprises recovered symbols that include forward error correction encoded symbols; and
further comprising a decoder to recover information bits associated with the forward error correction encoded symbols.

32. The system of claim 21 wherein the high-rate linear MMSE detector is based on modeling the low-rate users as effective high-rate users, the modeling based on a tree-structure property of spreading codes associated with the low-rate users;
the high-rate MMSE linear detector to generate effective high-rate outputs corresponding to the effective high-rate users; and
the second stage to combine successive effective high-rate outputs of the high-rate MMSE linear detector for an effective high-race user over a low-rate symbol period to generate the low-rate output corresponding to the one of the low-rate users.

33. The system of claim 32 wherein the second stage employs a combining technique selected from a group consisting of Decoupling Combining and MMSE Combining.

34. The system of claim 20 wherein the general linear transformation detector is based on modeling the low-rate users as effective high-rate users, the modeling based on a tree-structure property of spreading codes associated with the low-rate users;
the general linear transformation detector to generate effective high-rate outputs corresponding to the effective high-rate users;
the second stage to combine successive effective high-rate outputs of the general linear transformation detector for the an effective high-rate user over a low-rate symbol period to generate the low-rate output corresponding to the one of the low-rate users; and
the second stage combining technique based on General Combining Decoupling.

35. The system of claim 32 wherein the input signal includes interfering higher-rate users having a symbol period shorter than the high-rate detection intervals of the high-race linear MMSE detector.

36. The system of claim 32 wherein the input signal is selected from a group consisting of a sampled signal and at least one output of a front-end high-rate detector applied to the sampled signal.

37. The system of claim 32 wherein a length of the detection window is not a function of a length of the high-rate detection interval.

38. The system of claim 32 wherein the detection window is greater than the high-rate detection interval and is sliding such that successive detection windows overlap, each detection of the successive detection windows producing a high-rate output.

39. The system of claim 32 further comprising a space-time adaptive processor to generate the input signal from multi-antenna signal streams.

40. The system of claim 32 further including a cancellation module to apply interference cancellation processing to the input signal before the high-rate linear MMSE detector.

41. The system of claim 32 wherein the low-rate output is used to estimate and cancel interference.

42. The system of claim 32 wherein the low-rate output further comprises recovered symbols that include forward error correction encoded symbols; and further comprising a decoder to recover information bits associated with the forward error correction encoded symbols.

43. A system comprising
a first stage to transform a set of inputs over a low-rate interval and to generate sets of transformed inputs corresponding to predetermined high-rate intervals within a detection window, the set of inputs having embedded information corresponding to low-rate users, the low-rate users modeled as an effective high-rate user based on a tree-structure property of spreading codes associated with the low-rate users, spreading codes of interfering users and the effective high-rate user being cyclic and repeating to within a sign change at each high-rate interval;
within the set of transformed inputs corresponding to a predetermined high-rate interval, one of the low-rate users is decoupled from others of the low-rate users that comprise the effective high-rate user; and
a second stage to apply a general linear detector to the transformed set of inputs over the predetermined high-rate intervals within the detection window, to generate an estimate of one of the low-rate users.

44. The system of claim 43 wherein the general linear detector is a Minimum Mean Square Error (MMSE) linear detector.

45. The system of claim 44 wherein the set of inputs includes interfering higher-rate users having a symbol period shorter than the high-rate interval.

46. The system of claim 44 wherein the set of inputs is selected from the group consisting of a sampled signal, and at least one output of a front-end high-rate detector applied to the sampled signal.

47. The system of claim 44 wherein a length of the detection window is independent of a length of the high-rate interval.

48. The system of claim 44 wherein the detection window is greater than the high-rate interval.

49. The system of claim 44 further comprising a space-time adaptive processor to generate the set of inputs from multi-antenna signal streams.

50. The system of claim 44 further including a cancellation module to apply interference cancellation processing to the set of inputs.

51. The system of claim 44 wherein at least one output of the second stage is used to estimate and cancel interference.

52. The system of claim 44 wherein the estimate of one of the low-rate users includes forward error correction encoded symbols to be processed by a decoder to recover information bits.

53. The system of claim 44 wherein a sampled receive signal includes the set of inputs modulated by a long spreading sequence that does not satisfy the tree-structured property, the set of inputs being generated by stripping off the long spreading sequence.

54. The system of claim 43 wherein the first stage further comprises post-multiplying a matrix containing the set of inputs by a column of a Walsh Hadamard Transform matrix.

55. A method comprising:
receiving an input signal including at least one actual high rate user and a plurality of low rate users, the actual high rate user having a higher symbol rate than the low rate users;
applying a high rate Minimum Mean Square Error (MMSE) transformation to the input signal over a high rate detection interval that is above a low-rate symbol rate of low rate user;
based on the MMSE transformation, generating a detector output corresponding to the at least one actual high rate user and the plurality of low rate users; and
outputting said detector output.

56. The method of claim 55 wherein the at least one detector output is an actual high rate output corresponding to the at least one actual high rate user.

57. The method of claim 55 further comprising generating at least one effective high-rate output corresponding to a group of the low-rate users.

58. The method of claim 55 wherein the at least one detector output is a low-rate output corresponding to a one of the plurality of low-rate users.

59. The method of claim 58 further comprising generating at least one effective high-rate output corresponding to a group of the low-rate users.

60. The method of claim 58 further comprising combining successive high-rate outputs over a low-rate symbol period to generate the low rate output corresponding to the one of the plurality of low-rate users.

61. The method of claim 60 wherein combining includes a transformation selected from a group consisting of decoupling combining and MMSE combining.

62. The method of claim 55 further comprising selecting a detection window of the high rate MMSE transformation such that the detection window is not a function of the high rate detection interval.

63. The method of claim 62 further comprising selecting the detection window to be greater than the high rate detection interval and sliding such that successive detection windows overlap.

64. The method of claim 55 further comprising space-time adaptive processing to generate the input signal from multi-antenna signal streams.

65. The method of claim 55 further comprising applying interference cancellation processing to the input signal before the high-rate linear MMSE detector.

66. The method of claim 55 further comprising estimating and canceling interference based on recovered symbols included in the at least one detector output.

67. The method of claim 55 further comprising applying forward error correction to the at least one detector output.

68. An article comprising a machine readable medium including machine readable instructions that when executed by a machine cause the machine to:
receive an input signal including at least one actual high rate user and a plurality of low rate users, the actual high rate user having a higher symbol rate than the low rate users;
apply a high rate Minimum Mean Square Error (MMSE) transformation to the input signal over a high rate detection interval that is above a low-rate symbol rate of low rate user;
based on the MMSE transformation, generate a detector output corresponding to the at least one actual high rate user and the plurality of low rate users; and
output said detector output.

69. The article of claim 68 wherein the at least one detector output is an actual high rate output corresponding to the at least one actual high rate user.

70. The article of claim 68 further comprising generating at least one effective high-rate output corresponding to a group of the low-rate users.

71. The article of claim 68 wherein the at least one detector output is a low-rate output corresponding to a one of the plurality of low-rate users.

72. The article of claim 71 further comprising generating at least one effective high-rate output corresponding to a group of the low-rate users.

73. The article of claim 71 further comprising combining successive high-rate outputs over a low-rate symbol period to generate the low rate output corresponding to the one of the plurality of low-rate users.

74. The article of claim 73 wherein combining includes a transformation selected from a group consisting of decoupling combining and MMSE combining.

75. The article of claim 68 further comprising selecting a detection window of the high rate MMSE transformation such that the high rate detection window is not a function of the detection interval.

76. The article of claim 75 further comprising selecting the detection window to be greater than the high rate detection interval and sliding such that successive detection windows overlap.

77. The article of claim 68 further comprising space-time adaptive processing to generate the input signal from multi-antenna signal streams.

78. The article of claim 68 further comprising applying interference cancellation processing to the input signal before the high-rate linear MMSE detector.

79. The article of claim 68 further comprising estimating and canceling interference based on recovered symbols included in the at least one detector output.

80. The article of claim 68 further comprising applying forward error correction to the at least one detector output.

81. A system comprising:
a high-rate minimum mean square error (MMSE) detector to recover received user symbols in the presence of low-rate user symbol, the high-rate detector operating over a detection window.

82. The system of claim 81 wherein the received user symbols include high-rate user symbols.

83. The system of claim 81 wherein the received user symbols include low-rate user symbols.

84. The system of claim 83 further comprising a decoupler combiner to process high-rate outputs of the high-rate MMSE detector over a low-rate interval to obtain the low-rate user symbols.

85. The system of claim 83 further comprising an MMSE combiner to process high-rate outputs of the high-rate MMSE detector over a low-rate interval to obtain the low-rate user symbols.

86. The system of claim 81 wherein the high-rate MMSE detector includes a linear detector.

87. The system of claim 81 wherein the high-rate MMSE detector utilizes symbol-level processing.

88. The system of claim 81 wherein the high-rate MMSE detector utilizes chip-level processing.

89. The system of claim 83 wherein the high-rate MMSE detector models groups of the low-rate user symbols as effective high-rate user symbols.

90. The system of claim 82 wherein the high-rate MMSE detector models groups of the low-rate user symbols as effective high-rate user symbols.

91. A system comprising:
an antenna to communicate information over a wireless link;
a transceiver coupled to the antenna to convert received information to an input signal having received user symbols and low-rate user symbols;
a baseband device coupled to the transceiver to implement system control;
an input/output device coupled to the baseband device to provide a man-machine interface; and
a high-rate minimum mean square error (MMSE) detector to receive the input signal and to recover the received user symbols in the presence of the low-rate user symbols, the high-rate detector operating over a detection window.

92. The system of claim 91 wherein the received user symbols include high-rate user symbols.

93. The system of claim 91 wherein the received user symbols include low-rate user symbols.

94. The system of claim 93 further comprising a decoupler combiner to process high-rate outputs of the high-rate MMSE detector over a low-rate interval to obtain the low-rate user symbols.

95. The system of claim 93 further comprising an MMSE combiner to process high-rate outputs of the high-rate MMSE detector over a low-rate interval to obtain the low-rate user symbols.

96. The system of claim 91 wherein the high-rate MMSE detector includes a linear detector.

97. The system of claim 91 wherein the high-rate MMSE detector utilizes symbol-level processing.

98. The system of claim 91 wherein the high-rate MMSE detector utilizes chip-level processing.

99. The system of claim 93 wherein the high-rate MMSE detector models groups of the low-rate user symbols as effective high-rate user symbols.

100. The system of claim 92 wherein the high-rate MMSE detector models groups of the low-rate user symbols as effective high-rate user symbols.

101. A system, comprising:
a high-rate linear Minimum Mean Square Error (MMSE) detector having a detection window, and producing outputs every high-rate detection interval, to generate at least one actual high-rate output based upon decoding an input signal that includes actual high-rate users and low-rate users, the at least one actual high-rate output corresponding to one of the actual high-rate users, the high-rate users having a higher symbol rate than the low-rate users, wherein the high-rate linear MMSE detector is based on modeling the low-rate users as effective high-rate users, the modeling based on a tree-structure property of spreading codes associated with the low-rate users.

102. The system of claim 101 wherein the input signal includes interfering higher-rate users having a symbol period shorter than the high-rate detection intervals of the high-rate linear MMSE detector.

103. The system of claim 101 wherein the input signal is selected from a group consisting of a sampled signal and at least one output of a front-end high-rate detector applied to the sampled signal.

104. The system of claim 101 wherein a length of the detection window is independent of a length of the high-rate detection interval.

105. The system of claim 101 wherein the detection window is greater than the high-rate detection interval and is sliding such that successive detection windows overlap, each detection of the successive detection windows producing a high-rate output for at least one symbol of the one of the actual high-rate users.

106. The system of claim 101 further comprising a space-time adaptive processor to generate the input signal from multi-antenna signal streams.

107. The system of claim 101 further including a cancellation module to apply interference cancellation processing to the input signal before the high-rate linear MMSE detector.

108. The system of claim 101 wherein the actual high-rate outputs are used to estimate and cancel interference in the input signal.

109. The system of claim 101 wherein at least one of the actual high-rate outputs further comprise recovered symbols that include forward error correction encoded symbols; and further comprising a decoder to recover information bits associated with the forward error correction encoded symbols.

* * * * *